(12) United States Patent
Yao et al.

(10) Patent No.: US 11,827,829 B2
(45) Date of Patent: *Nov. 28, 2023

(54) LIQUID CRYSTAL COMPOSITION CONTAINING DIBENZO DERIVATIVE AND LIQUID CRYSTAL DISPLAY DEVICE

(71) Applicant: JIANGSU HECHENG DISPLAY TECHNOLOGY CO., LTD., Nanjing (CN)

(72) Inventors: Lifang Yao, Yangzhong (CN); Di He, Yangzhong (CN); Haibin Xu, Yangzhong (CN); Wenquan Ding, Yangzhong (CN); Shuang Xu, Yangzhong (CN)

(73) Assignee: JIANGSU HECHENG DISPLAY TECHNOLOGY CO., LTD., Jiangsu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/359,123

(22) Filed: Jun. 25, 2021

(65) Prior Publication Data

US 2022/0002623 A1  Jan. 6, 2022

(30) Foreign Application Priority Data

Jun. 28, 2020  (CN) .......................... 202010600242.X

(51) Int. Cl.
C09K 19/30 (2006.01)
C09K 19/12 (2006.01)
C09K 19/18 (2006.01)
C09K 19/20 (2006.01)

(52) U.S. Cl.
CPC .......... C09K 19/3003 (2013.01); C09K 19/12 (2013.01); C09K 19/18 (2013.01); C09K 19/3048 (2013.01); C09K 19/3059 (2013.01); C09K 19/3068 (2013.01); C09K 2019/122 (2013.01); C09K 2019/123 (2013.01); C09K 2019/181 (2013.01); C09K 2019/2035 (2013.01); C09K 2019/3004 (2013.01); C09K 2019/305 (2013.01); C09K 2019/3009 (2013.01); C09K 2019/3016 (2013.01); C09K 2019/3063 (2013.01); C09K 2019/3071 (2013.01); C09K 2019/3075 (2013.01); C09K 2019/3077 (2013.01); C09K 2019/3078 (2013.01); C09K 2019/3083 (2013.01)

(58) Field of Classification Search
CPC .................................................... C09K 19/12
See application file for complete search history.

(56) References Cited

U.S. PATENT DOCUMENTS

2015/0259602 A1  9/2015  Reiffenrath et al.
2019/0093013 A1*  3/2019  Manabe .............. C09K 19/3098
2019/0256775 A1*  8/2019  Wang ................ C09K 19/3405
2019/0345129 A1*  11/2019  Li ........................ C09K 19/068
2020/0032143 A1  1/2020  Takata
2020/0239778 A1*  7/2020  Kang ................ C09K 19/3405
2021/0139451 A1*  5/2021  Lietzau ................ C07D 333/76

FOREIGN PATENT DOCUMENTS

| CN | 104926765 A | 9/2015 |
| CN | 108264498 A | 7/2018 |
| CN | 108517218 A | 9/2018 |
| CN | 108865178 A | 11/2018 |
| CN | 109504401 A | 3/2019 |
| CN | 109666485 A | 4/2019 |
| CN | 110028976 A | 7/2019 |
| CN | 110229676 A | 9/2019 |
| CN | 110300746 A | 10/2019 |
| CN | 111040776 A | 4/2020 |
| CN | 111484856 A | 8/2020 |
| CN | 111484857 A | 8/2020 |
| CN | 111484858 A | 8/2020 |
| CN | 112980464 A | 6/2021 |
| CN | 113122272 A | 7/2021 |
| JP | 2019077792 A | 5/2019 |
| JP | 2019147859 A | 9/2019 |
| TW | I769857 B | 7/2022 |

OTHER PUBLICATIONS

Office Action dated Sep. 29, 2021 for Taiwanese Application No. TW20190112340 filed Apr. 9, 2019. (6 pages).

* cited by examiner

Primary Examiner — Chanceity N Robinson
(74) Attorney, Agent, or Firm — Brown Rudnick LLP; Matthew P. York

(57) ABSTRACT

A liquid crystal composition containing a dibenzo derivative comprising a compound of general formula I and a compound of general formula II, and a liquid crystal display device containing the same, are disclosed. The liquid crystal composition is characterized by its excellent physical properties with respect to a liquid crystal display. The liquid crystal display device containing the liquid crystal composition has a good transmittance and a high contrast.

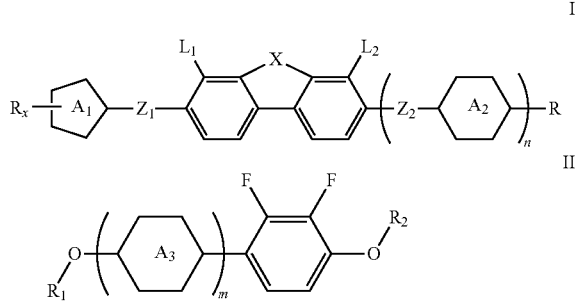

20 Claims, No Drawings

LIQUID CRYSTAL COMPOSITION CONTAINING DIBENZO DERIVATIVE AND LIQUID CRYSTAL DISPLAY DEVICE

CROSS-REFERENCE TO RELATED APPLICATION(S)

The present application claims priority to Chinese Patent Application No. CN 202010600242.X filed on Jun. 28, 2020, the disclosure of which is incorporated herein by reference in its entirety.

TECHNICAL FIELD

The present disclosure belongs to the technical field of liquid crystal display materials and specifically relates to a liquid crystal composition containing a dibenzo derivative and a liquid crystal display device.

BACKGROUND

The liquid crystal display (LCD) has been rapidly developed because of its small size, light weight, low power consumption, and excellent display quality, and thus has been widely applied especially in portable electronic information products. According to the type of display mode, liquid crystal displays can be divided into displays of the following modes: phase change (PC), twist nematic (TN), super twisted nematic (STN), electrically controlled birefringence (ECB), optically compensated bend (OCB), in-plane switching (IPS), fringe field switching (FFS), vertical alignment (VA), and polymer stable alignment (PSA).

Among these modes, it is known that the IPS mode, FFS mode, and VA mode can improve the shortcoming of narrow viewing angle of action modes such as the TN mode and STN mode. Liquid crystal displays of these display modes mainly use liquid crystal compositions having negative dielectric anisotropy. In order to further improve the characteristics of the liquid crystal display, the composition preferably has the following physical properties (1) to (8):

(1) high stability to heat, light, etc.;
(2) high clearing point;
(3) low lower limit temperature of liquid crystal phase;
(4) low viscosity;
(5) appropriate optical anisotropy;
(6) large negative dielectric anisotropy;
(7) appropriate elastic constant;
(8) good compatibility of liquid crystal compound.

The physical properties of liquid crystal compositions have an important influence on the display effect of liquid crystal displays. For example, the liquid crystal composition with high stability to heat, light, and the like can increase the voltage retention rate of the liquid crystal display, thereby prolonging the service life of the liquid crystal display. The liquid crystal composition with a high clearing point and low lower limit temperature of the liquid crystal phase can expand the usable temperature range of the liquid crystal display. The liquid crystal composition with low viscosity can shorten the response time of the liquid crystal display. The liquid crystal composition having appropriate optical anisotropy can improve the contrast of the liquid crystal display, and the liquid crystal composition having large optical anisotropy is preferable when the liquid crystal display has been gradually developing thinner. The liquid crystal composition having large negative dielectric anisotropy can reduce the threshold voltage of the liquid crystal display element, thereby reducing the power consumption.

The liquid crystal composition with a large elastic constant can shorten the response time of the liquid crystal display, and the liquid crystal composition with a small elastic constant can reduce the threshold voltage of the liquid crystal display. Good compatibility of the liquid crystal compound is beneficial to mixing liquid crystal compounds with different physical properties to adjust the physical properties of the liquid crystal composition.

In addition, improving the contrast of the liquid crystal display is also one of the goals sought to be achieved by the industry through continuous researches. The research shows that the most important factor affecting the contrast of the liquid crystal display element is the light leakage of the liquid crystal material, the main factor affecting the light leakage is LC Scattering of the liquid crystal material, and the LC Scattering and the average elastic constant $K_{ave}$ has the following relationship:

$$LC\ Scattering \propto \frac{d \cdot \Delta n^2 \cdot (n_e + n_o)^2}{K_{ave}},$$

wherein d denotes the distance between liquid crystal cells, $n_e$ denotes the refractive index of extraordinary light, and $n_o$ denotes the refractive index of ordinary light. It can be seen from this relationship that LC Scattering is inversely proportional to $K_{ave}$, and the light leakage of the liquid crystal material can be reduced by increasing $K_{ave}$.

In addition, the contrast (CR) and the luminance (L) has the following relationship:

$$CR = L_{255}/L_0 \times 100\%,$$

wherein $L_{255}$ denotes the On-state luminance, and $L_0$ denotes the Off-state luminance. It can be seen that CR is significantly affected by the change of $L_0$. In the Off state, $L_0$ has nothing to do with the dielectric of the liquid crystal molecule but is related to the LC Scattering of the liquid crystal material. The smaller the LC Scattering, the smaller the $L_0$, and the more significantly CR will be increased.

In addition, the current liquid crystal display device still has the problem of high power consumption, because only about 5% of the backlight can penetrate the display device and then be captured by human eyes while most of the light is "wasted". If the liquid crystal with high light transmittance can be developed, the backlight intensity can be reduced, thus achieving the purpose of saving energy consumption and prolonging the service time of the device.

Chinese Patent No. CN104926765A discloses a 4,6-difluorodibenzofuran derivative having a structure similar to the following formula:

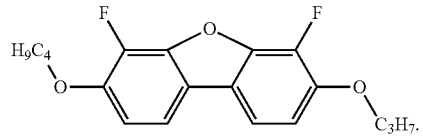

The above-mentioned compound has negative dielectric anisotropy and the characteristics of the large absolute value of dielectric anisotropy and the large optical anisotropy, but has poorer intersolubility than other liquid crystal compounds.

Chinese Patent No. CN110300746A discloses a 4,6-difluorodibenzofuran derivative having a ring terminal group (having a structure similar to the following formula):

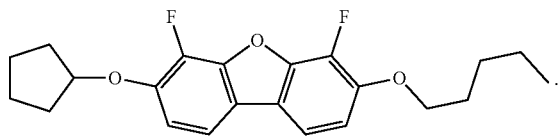 [SMILES: CCCCCOc1ccc2c(oc3c(F)c(OC4CCCC4)ccc32)c1F]

The compatibility of such a 4,6-difluorodibenzofuran derivative having a ring terminal group has improved compared with that of other liquid crystal compounds, but the transmittance and contrast of the liquid crystal composition containing the above-mentioned compound often cannot meet the increasingly changing requirements of liquid crystal displays.

Therefore, on the basis of the related art, it is expected to develop a liquid crystal composition with higher transmittance and higher contrast, so as to meet the increasing requirements of visual effects and low power consumption of the liquid crystal display.

SUMMARY

In view of the defects existing in the related art, an object of the present disclosure is to provide a liquid crystal composition containing a dibenzo derivative and a liquid crystal display device containing the same. The liquid crystal composition has the characteristics of high clearing point, large optical anisotropy, large dielectric anisotropy, large $\varepsilon_\perp$ (i.e., dielectric constant perpendicular to the molecular axis), large $\varepsilon_\perp/|\Delta\varepsilon|$ (i.e., ratio of perpendicular dielectric to a absolute value of dielectric), and large $K_{ave}$ (i.e., average elastic constant).

In order to achieve the object of the present disclosure, the present disclosure adopts the following technical solutions.

In a first aspect, the present disclosure provides a liquid crystal composition containing a dibenzo derivative. The liquid crystal composition includes at least one compound of general formula I and at least one compound of general formula II:

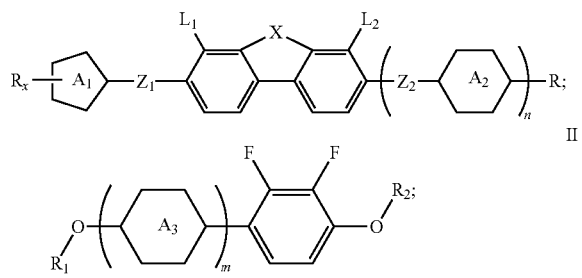

wherein
R represents —H, halogen, —CN, straight or branched alkyl containing 1 to 12 carbon atoms,

wherein one or at least two non-adjacent —CH$_2$— in the straight or branched alkyl containing 1 to 12 carbon atoms,

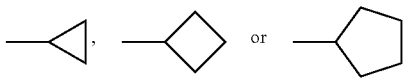

may be respectively and independently substituted by —CH=CH—, —C≡C—, —O—, —S—, —CO—, —CO—O— or —O—CO—, and one or at least two —H in the straight or branched alkyl containing 1 to 12 carbon atoms,

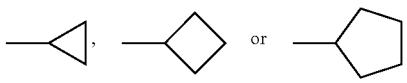

may be respectively and independently substituted by —F or —Cl;

R$_x$ represents —H or straight or branched alkyl containing 1 to 12 carbon atoms, wherein one or at least two non-adjacent —CH$_2$— in the straight or branched alkyl containing 1 to 12 carbon atoms may be respectively and independently substituted by —CH=CH—, —C≡C—, —O—, —S—, —CO—, —CO—O— or —O—CO—, one or at least two —H in the straight or branched alkyl containing 1 to 12 carbon atoms may be respectively and independently substituted by —F or —Cl, and R$_x$ is attached to an arbitrary carbon atom in the ring

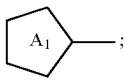

R$_1$ and R$_2$ each independently represents straight or branched alkyl containing 1 to 12 carbon atoms,

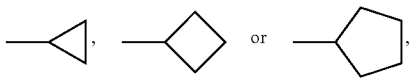

wherein one or at least two non-adjacent —CH$_2$— in the straight or branched alkyl containing 1 to 12 carbon atoms may be respectively and independently substituted by —CH=CH—, —C≡C—, —O—, —S—, —CO—, —CO—O— or —O—CO—, one or at least two —H in the straight or branched alkyl containing 1 to 12 carbon atoms may be respectively and independently substituted by —F or —Cl, and R$_1$ and R$_2$ are each attached to an oxygen atom in general formula II via a carbon atom;

the ring

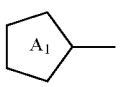

represents

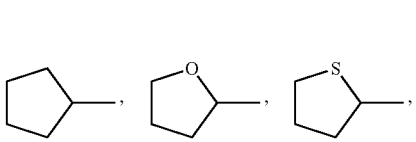

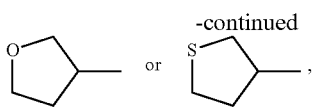 or 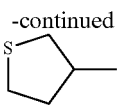, wherein one or at least two intra-ring single bonds in the preceding group may be substituted by a double bond(s);

the ring

represents

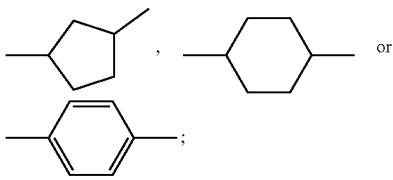 or

;

wherein in

 or , one or at least two —CH$_2$— may be substituted by —O—, and one or at most two intra-ring single bonds may be substituted by a double bond(s); and in

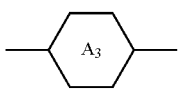, one or at least two —H may be substituted by —F or —Cl, and one or at least two intra-ring —CH= may be substituted by —N=; ("One or at least two" in "one or at least two intra-ring —CH= may be substituted by —N=" refers to the number of —CH= substituted by —N=, and the same expression involved in the present disclosure has the same meaning);

the ring

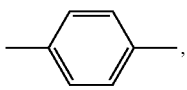

represents

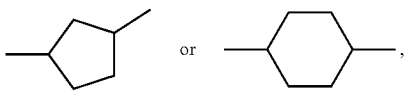, wherein one or at least two —H in

may be substituted by —F or —Cl, and one or at least two intra-ring —CH= may be substituted by —N=;

Z$_1$ represents —(CH$_2$)$_a$O— or —(CH$_2$)$_a$S—, wherein a represents an integer from 0 to 7, for example, a may be 0, 1, 2, 3, 4, 5, 6 or 7;

Z$_2$ represents —O—, —S—, —CO—O—, —O—CO—, —CF$_2$O—, —OCF$_2$—, —CH$_2$O—, —CH$_2$S—, —OCH$_2$—, —SCH$_2$—, —CH$_2$—, —CH$_2$CH$_2$—, —(CH$_2$)$_4$—, —CH=CH—CH$_2$O—, —C$_2$F$_4$—, —CH$_2$CF$_2$—, —CF$_2$CH$_2$—, —CF=CF—, —CH=CF—, —CF=CH—, —CH=CH—, —C≡C— or a single bond;

L$_1$ and L$_2$ each independently represents —F, —Cl, —CF$_3$ or —CHF$_2$;

X represents —CO—, —S— or —O—;

n represents 0, 1 or 2, wherein when n represents 2, the ring

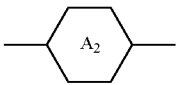

is the same or different, and Z$_2$ is the same or different; and m represents 0, 1 or 2, wherein when m represents 2, the ring

is the same or different.

When n=2, the compound has two

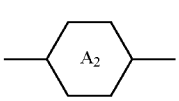, and the two

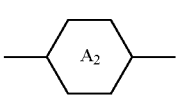

have the same structure or different structures. For example, one of the two

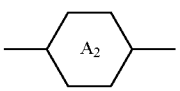

may be

and the other is

The expression of "being the same or different" involved in the present disclosure has the same meaning.

In the present disclosure, the expression of "may be respectively and independently substituted by . . . " means it may be substituted or not, that is, being substituted or not substituted, both of which fall within the scope of the present disclosure. The same applies to the expression of "may be respectively and independently replaced by . . . ". The "substitution" and "replacement" may occur at an arbitrary position.

In the present disclosure, the short straight line(s) on one side or both sides of the group structure represent the access bond and do not represent methyl, such as the short straight line on the right side of

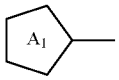

and the short straight lines on both sides of

In the present disclosure, halogen includes fluorine, chlorine, bromine, iodine or the like.

In the present disclosure, the 1 to 12 carbon atoms may be 1, 2, 3, 4, 5, 6, 7, 8, 9, 10, 11 or 12 carbon atoms.

In a preferred embodiment of the present disclosure, the ring

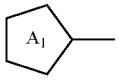

represents

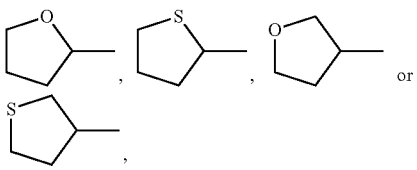

wherein one or at least two intra-ring single bonds in the preceding group may be substituted by a double bond(s). Further preferably, the ring

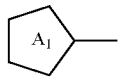

represents

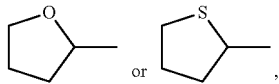

wherein one or at least two intra-ring single bonds in the preceding group may be substituted by a double bond(s).

The compound of general formula I and the compound of general formula II of the present disclosure both have an increasing effect on $\varepsilon_\perp$ (i.e., the dielectric constant perpendicular to the molecular axis), $\varepsilon_\perp/|\Delta\varepsilon|$ (i.e., the ratio of the perpendicular dielectric to the absolute value of dielectric), and $K_{ave}$ (i.e., the average elastic constant) of the liquid crystal composition, and can produce a more significant improvement effect through the synergistic effect of both compounds.

In a preferred embodiment of the present disclosure, n represents 0 or 1.

In a preferred embodiment of the present disclosure, $L_1$ and $L_2$ each represents —F.

In a preferred embodiment of the present disclosure, X represents —O— or —S—.

In a preferred embodiment of the present disclosure, the liquid crystal composition includes at least one compound of general formula I in which X represents —O—; further preferably, the liquid crystal composition includes at least one compound of general formula I in which X represents —O— and at least one compound of general formula I in which X represents —S—.

In a preferred embodiment of the present disclosure, a represents an integer from 0 to 3, for example, 0, 1, 2 or 3; further preferably, a represents an integer from 1 to 3; more preferably, a represents 1.

In a preferred embodiment of the present disclosure, R represents —H, straight or branched alkyl containing 1 to 12 (for example, 1, 2, 3, 4, 5, 6, 8, 10 or 11) carbon atoms,

wherein one or at least two non-adjacent —CH$_2$— in the straight or branched alkyl containing 1 to 12 carbon atoms,

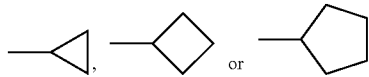

may be respectively and independently substituted by —CH=CH—, —O— or —S—, wherein one or at least two —H in the straight or branched alkyl containing 1 to 12 carbon atoms,

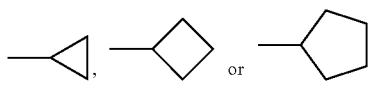

may be respectively and independently substituted by —F.

Further preferably, R represents straight alkyl containing 1 to 12 carbon atoms or alkoxy containing 1 to 11 carbon atoms.

In a preferred embodiment of the present disclosure, $R_x$ represents —H or straight or branched alkyl containing 1 to 12 (for example, 1, 2, 3, 4, 5, 6, 8, 10 or 11) carbon atoms; further preferably, $R_x$ represents —H or straight alkyl containing 1 to 6 carbon atoms.

In a preferred embodiment of the present disclosure, the compound of general formula I accounts for 0.1% to 40%, for example, 0.2%, 0.5%, 0.8%, 1%, 3%, 5%, 8%, 10%, 12%, 15%, 18%, 20%, 22%, 25%, 28%, 30%, 32%, 35%, 37% or 39%, of the total weight of the liquid crystal composition; further preferably, the compound of general formula I accounts for 1% to 30% of the total weight of the liquid crystal composition.

In a preferred embodiment of the present disclosure, the ring

represents

.

In a preferred embodiment of the present disclosure, m represents 0 or 1.

In a preferred embodiment of the present disclosure, $R_1$ and $R_2$ each independently represents straight or branched alkyl containing 1 to 12 (for example, 1, 2, 3, 4, 5, 6, 8, 10 or 11) carbon atoms, one or at least two non-adjacent —CH$_2$— in the straight or branched alkyl containing 1 to 12 carbon atoms are substituted by —O—.

In a preferred embodiment of the present disclosure, the liquid crystal composition includes at least one compound of general formula II in which m=0.

In a preferred embodiment of the present disclosure, the liquid crystal composition includes at least one compound of general formula II in which m=1.

In a preferred embodiment of the present disclosure, the liquid crystal composition includes at least one compound of general formula II in which m=0 and at least one compound of general formula II in which m=1.

In a preferred embodiment of the present disclosure, the liquid crystal composition includes at least one compound of general formula II in which $R_2$ represents alkoxyalkyl containing 2 to 11 carbon atoms. The alkoxyalkyl refers to a group in which —CH$_2$— that is not located at the terminal of alkyl is substituted by —O—, such as —CH$_2$OCH$_3$, —CH$_2$CH$_2$CH$_2$OCH$_2$CH$_2$CH$_2$CH$_3$, and the like.

In a preferred embodiment of the present disclosure, the compound of general formula II accounts for 0.1% to 30%, for example, 0.2%, 0.5%, 0.8%, 1%, 3%, 5%, 8%, 10%, 12%, 15%, 18%, 20%, 21%, 23%, 25%, 27% or 29%, of the total weight of the liquid crystal composition; further preferably, the compound of general formula II accounts for 1% to 25% of the total weight of the liquid crystal composition; more preferably, the compound of general formula II accounts for 1% to 20% of the total weight of the liquid crystal composition.

In a preferred embodiment of the present disclosure, the liquid crystal composition further includes one or at least two compounds of general formula M:

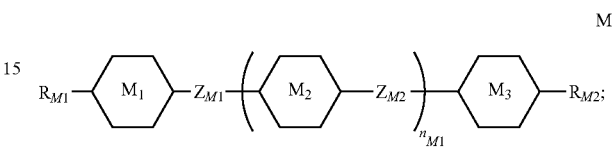

wherein $R_{M1}$ and $R_{M2}$ each independently represents straight or branched alkyl containing 1 to 12 (for example, 1, 2, 3, 4, 5, 6, 8, 10 or 11) carbon atoms,

wherein one or at least two non-adjacent —CH$_2$— in the straight or branched alkyl containing 1 to 12 carbon atoms may be respectively and independently substituted by —CH=CH—, —C≡C—, —O—, —CO—, —CO—O— or —O—CO—;

the ring

the ring

and the ring

each independently represents

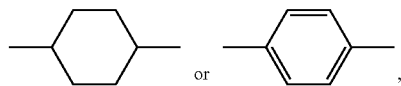

, wherein one or at least two —CH$_2$— in

may be substituted by —O—, and at most one —H in

may be substituted by halogen;

$Z_{M1}$ and $Z_{M2}$ each independently represent a single bond, —CO—O—, —O—CO—, —CH$_2$O—, —OCH$_2$—, —CH=CH—, —C≡C—, —CH$_2$CH$_2$—, —(CH$_2$)$_4$—, —CF$_2$O—, —OCF$_2$— or —CF$_2$CF$_2$—; and $n_{M1}$ represents 0, 1, 2 or 3, wherein when $n_{M1}$=2 or 3, the ring

is the same or different, and $Z_{M2}$ is the same or different.

In a preferred embodiment of the present disclosure, $R_{M1}$ and $R_{M2}$ each independently represents straight alkyl containing 1 to 10 (for example, 1, 2, 3, 4, 5, 6, 8, 9 or 10) carbon atoms, straight alkoxy containing 1 to 9 (for example, 1, 2, 3, 4, 5, 6, 8 or 9) carbon atoms or straight alkenyl containing 2 to 10 (for example, 2, 3, 4, 5, 6, 8, 9 or 10) carbon atoms.

Further preferably, $R_{M1}$ and $R_{M2}$ each independently represents straight alkyl containing 1 to 8 carbon atoms, straight alkoxy containing 1 to 7 carbon atoms or straight alkenyl containing 2 to 8 carbon atoms.

Further preferably, $R_{M1}$ and $R_{M2}$ each independently represents straight alkyl containing 1 to 5 carbon atoms, straight alkoxy containing 1 to 4 carbon atoms or straight alkenyl containing 2 to 5 carbon atoms.

In a preferred embodiment of the present disclosure, any one of $R_{M1}$ and $R_{M2}$ is straight alkenyl containing 2 to 5 carbon atoms, and the other is straight alkyl containing 1 to 5 carbon atoms.

The alkenyl in the present disclosure is preferably a group represented by any one of formulas (V1) to (V9), particularly preferably the formula (V1), (V2), (V8) or (V9). The groups represented by formulas (V1) to (V9) are as follows:

 (V1)

 (V2)

 (V3)

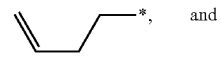 (V4)

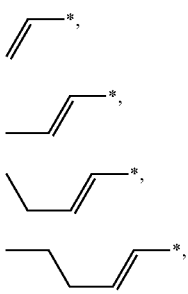

(V5)

(V6)

(V7)

(V8) and (V9)

wherein * represents the site through which the above-mentioned group is attached to the compound.

The alkenyloxy in the present disclosure is preferably a group represented by any one of formulas (OV1) to (OV9), particularly preferably the formula (OV1), (OV2), (OV8) or (OV9). The groups represented by formulas (OV1) to (OV9) are as follows:

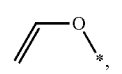 (OV1)

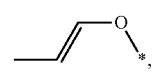 (OV2)

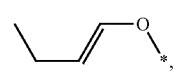 (OV3)

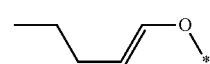 (OV4)

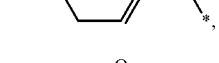 (OV5)

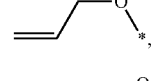 (OV6)

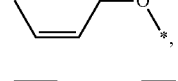 (OV7)

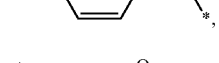 (OV8) and

 (OV9)

wherein * represents a carbon atom in the ring structure to be bonded.

In a preferred embodiment of the present disclosure, any one of $R_{M1}$ and $R_{M2}$ is straight alkyl containing 1 to 5 carbon atoms, and the other is straight alkyl containing 1 to 5 carbon atoms or straight alkoxy containing 1 to 4 carbon atoms; further preferably, $R_{M1}$ and $R_{M2}$ are each independently straight alkyl containing 1 to 5 carbon atoms.

In a preferred embodiment of the present disclosure, the compound of general formula M is selected from the group consisting of the following compounds:

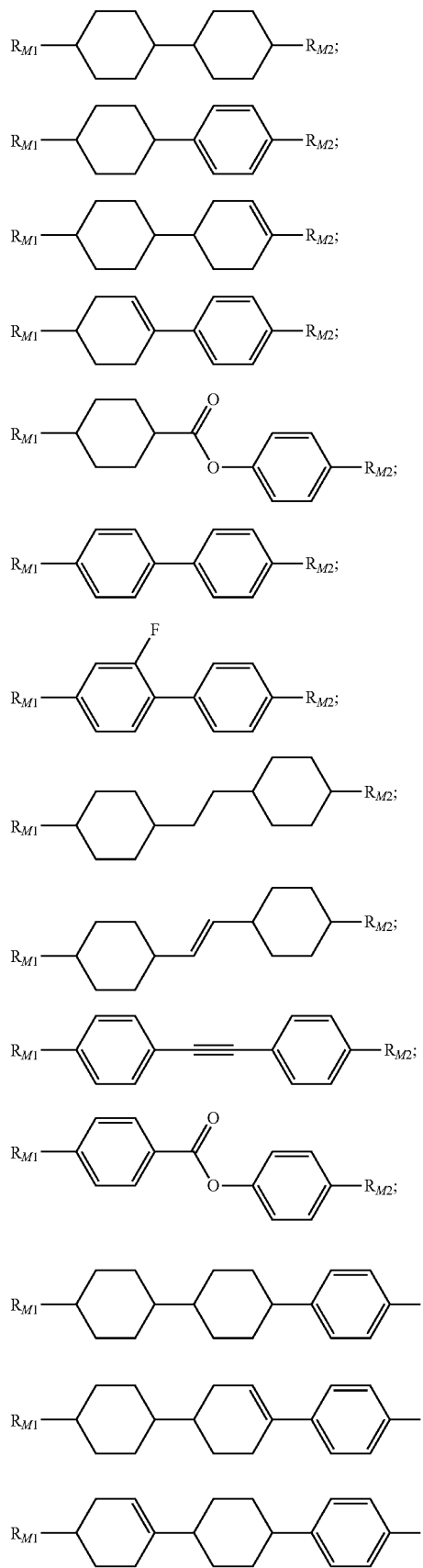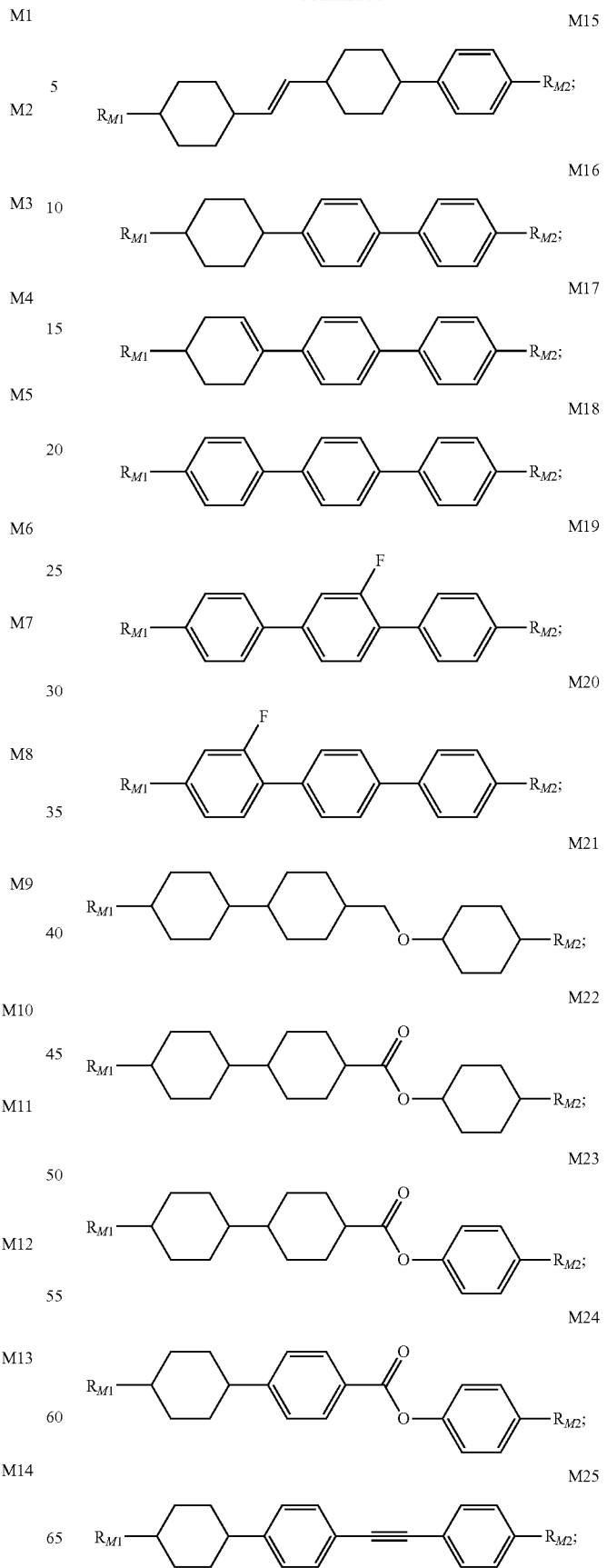

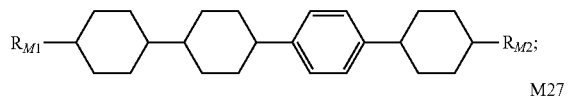
M26

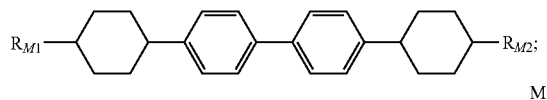
M27

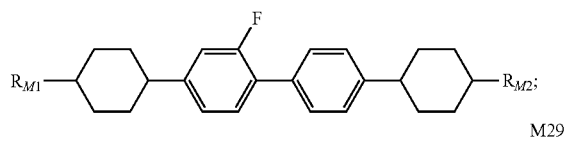
M28

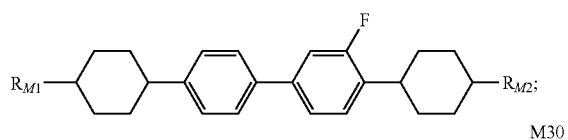
M29

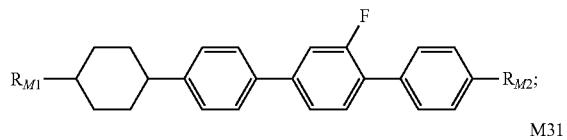
M30

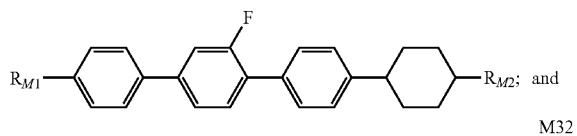
M31

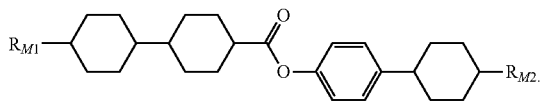
M32

In the above-mentioned compounds, $R_{M1}$ and $R_{M2}$ each independently represents straight or branched alkyl containing 1 to 12 carbon atoms, one or at least two non-adjacent —$CH_2$— in the straight or branched alkyl containing 1 to 12 carbon atoms may be respectively and independently substituted by —CH═CH— or —O—.

Preferably, the compound of general formula M accounts for 10% to 70%, for example, 11%, 13%, 15%, 18%, 20%, 22%, 25%, 28%, 30%, 33%, 35%, 38%, 40%, 43%, 45%, 48%, 50%, 52%, 55%, 58%, 60%, 62%, 65%, 67% or 69%, of the total weight of the liquid crystal composition.

In order to adjust the properties of the liquid crystal composition in terms of clearing point, viscosity, low-temperature storage stability and the like to enable the obtained liquid crystal display device to have great application value in addition to excellent performance in terms of transmittance and color performance, the components of the liquid crystal composition need to be adjusted. Specifically, with respect to the total weight of the liquid crystal composition of the present disclosure, the content of the compound of general formula M in which the ring

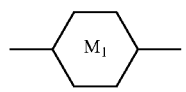

represents

is 10% to 50%; preferably, the content of the compound of general formula M in which the ring

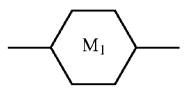

represents

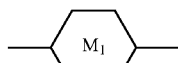

is 20% to 45%.

As for the content of the compound of general formula M, a high lower limit value and a high upper limit value are preferred when it is necessary to keep the viscosity of the liquid crystal composition of the present disclosure low and the response time thereof short; Further, a high lower limit value and a high upper limit value are preferred when it is necessary to keep the clearing point of the liquid crystal composition of the present disclosure high and the temperature stability good; and, when it is necessary to keep the driving voltage low and make the absolute value of the dielectric anisotropy become large, it is preferable to make the lower limit value of the content become low and the upper limit value become low.

In the case where reliability is a priority, preferably, $R_{M1}$ and $R_{M2}$ are each independently alkyl. In the case where reducing the volatility of the compound is a priority, preferably, $R_{M1}$ and $R_{M2}$ are each independently alkoxy. In the case where reducing viscosity is a priority, preferably, at least one of $R_{M1}$ and $R_{M2}$ is alkenyl.

In a preferred embodiment of the present disclosure, in order to further reduce the viscosity of the liquid crystal composition, the liquid crystal composition includes one or at least two compounds of general formula M1 in which $R_{M1}$ and/or $R_{M2}$ are n-propyl:

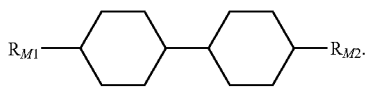
M1

In a preferred embodiment of the present disclosure, the liquid crystal composition further includes one or at least two compounds of general formula N:

wherein $R_{N1}$ and $R_{N2}$ each independently represents straight or branched alkyl containing 1 to 12 (for example, 1, 2, 3, 4, 5, 6, 8, 10 or 11) carbon atoms,

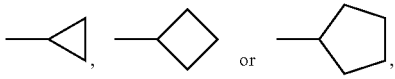

wherein one or at least two non-adjacent —CH$_2$— in the straight or branched alkyl containing 1 to 12 carbon atoms may be respectively and independently substituted by —O—, —CO—, —CO—O— or —O—CO—, one or at least two —H in the straight or branched alkyl containing 1 to 12 carbon atoms,

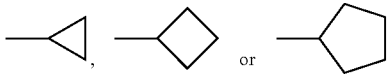

may be respectively and independently substituted by —F or —Cl, and at least one of $R_{N1}$ and $R_{N2}$ is attached to the ring structure in general formula N via a carbon atom, that is, the atoms through which $R_{N1}$ and $R_{N2}$ are attached to the ring structure in general formula N cannot be oxygen at the same time;

the ring

and the ring

each independently represents

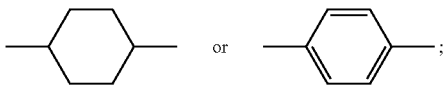

wherein in

one or at least two —CH$_2$— may be substituted by —O—; in

one or at least two —H may be substituted by —F or —Cl, and one or at least two intra-ring —CH═ may be substituted by —N═;

$Z_{N1}$ and $Z_{N2}$ each independently represent a single bond, —CO—O—, —O—CO—, —CH$_2$O—, —OCH$_2$—, —CH$_2$CH$_2$—, —(CH$_2$)$_4$—, —CF$_2$O—, —OCF$_2$— or —CF$_2$CF$_2$—;

$L_{N1}$ and $L_{N2}$ each independently represents —H or methyl;

$n_{N1}$ represents 0, 1, 2 or 3, $n_{N2}$ represents 0 or 1, and $0 \leq n_{N1}+n_{N2} \leq 3$, wherein when $n_{N1}$=2 or 3, the ring

is the same or different, and $Z_{N1}$ is the same or different.

In a preferred embodiment of the present disclosure, $R_{N1}$ and $R_{N2}$ each independently represent straight or branched alkyl or alkoxy containing 1 to 8 (for example, 1, 2, 3, 4, 5, 6, 7 or 8) carbon atoms; further preferably, $R_{N1}$ and $R_{N2}$ each independently represent straight or branched alkyl or alkoxy containing 1 to 5 carbon atoms.

In a preferred embodiment of the present disclosure, the ring

and the ring

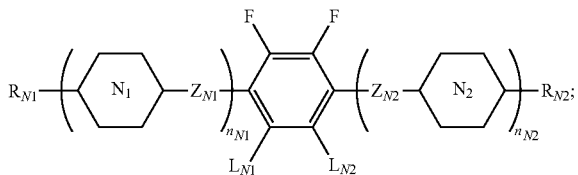

each independently represents

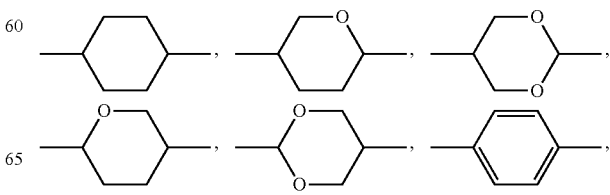

-continued
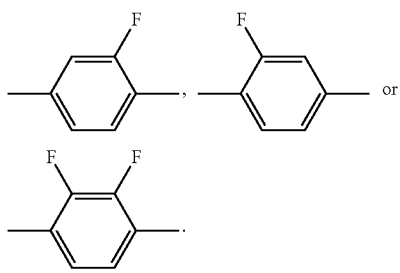
In a preferred embodiment of the present disclosure, the compound of general formula N is selected from the group consisting of the following compounds:
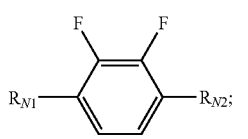
N1
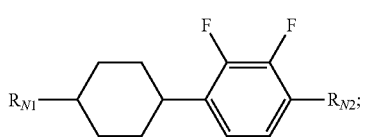
N2
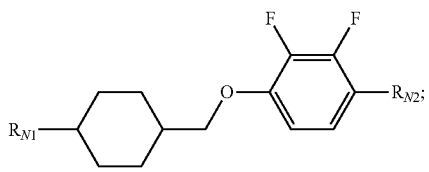
N3
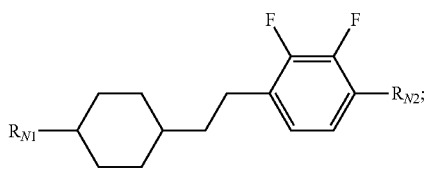
N4
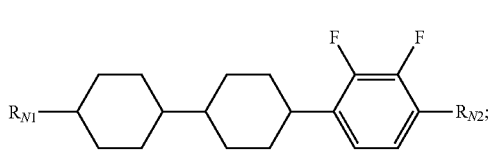
N5
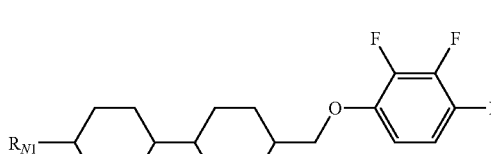
N6
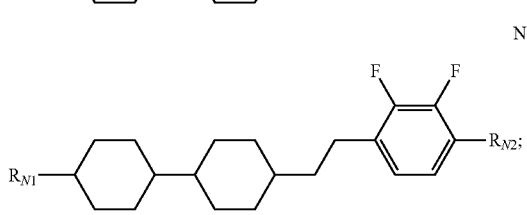
N7
-continued
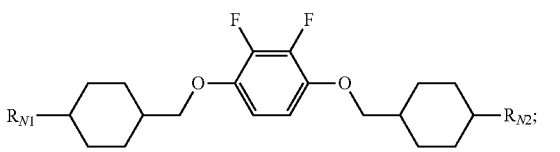
N8
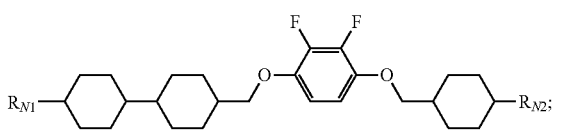
N9
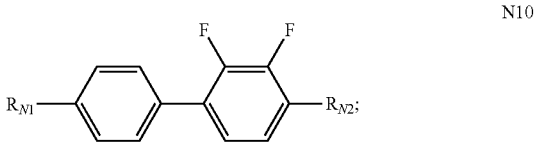
N10
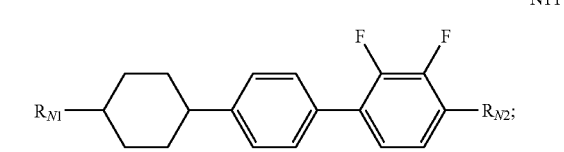
N11
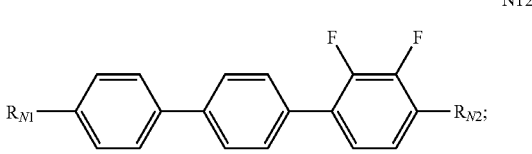
N12
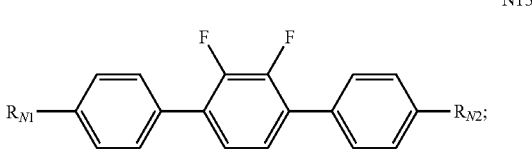
N13
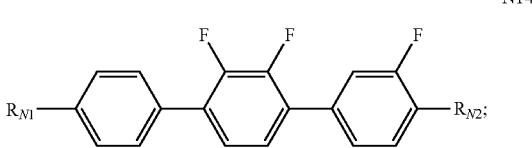
N14
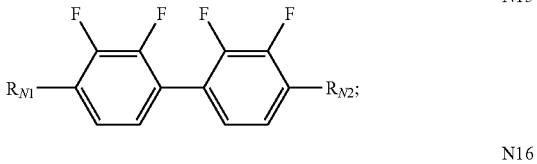
N15
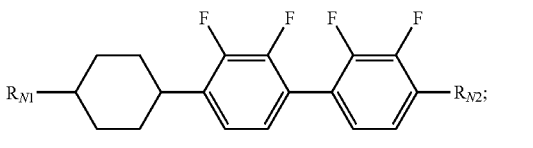
N16
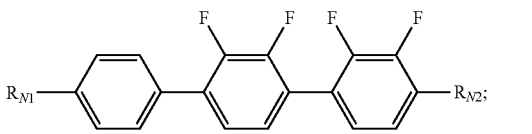
N17

-continued

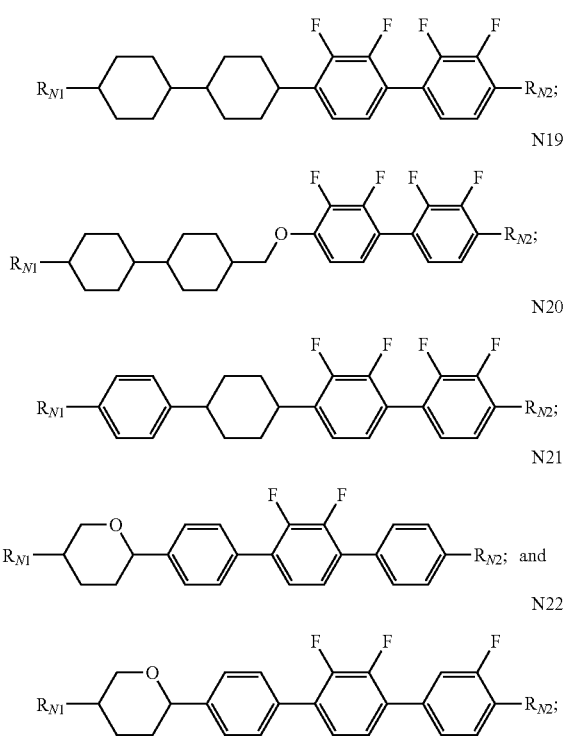

wherein
$R_{N1}$ represents straight or branched alkyl having 1 to 5 carbon atoms, and $R_{N2}$ represents straight or branched alkoxy having 1 to 4 carbon atoms.

Preferably, the compound of general formula N accounts for 1% to 75%, for example, 2%, 4%, 6%, 8%, 10%, 13%, 15%, 18%, 20%, 22%, 25%, 28%, 30%, 33%, 35%, 38%, 40%, 43%, 45%, 48%, 50%, 52%, 55%, 58%, 60%, 62%, 65%, 67%, 70%, 72% or 74%, of the total weight of the liquid crystal composition.

As for the content of the compound of general formula N, a low lower limit value and a low upper limit value are preferred when it is necessary to keep the response time of the liquid crystal display device of the present disclosure short; Further, a low lower limit value and a low upper limit value are preferred when it is necessary to keep the operating temperature range of the liquid crystal display device of the present disclosure wide; in addition, when it is necessary to keep the driving voltage of the liquid crystal composition of the present disclosure low and make the absolute value of the dielectric anisotropy become large, it is preferable to make the lower limit value of the content become high and the upper limit value become high.

In a preferred embodiment of the present disclosure, one or more other additives known to those skilled in the art and described in literature can be added to the liquid crystal composition.

In addition, additives such as antioxidants, light stabilizers and the like used in the liquid crystal composition of the present disclosure are preferably selected from the following substances:

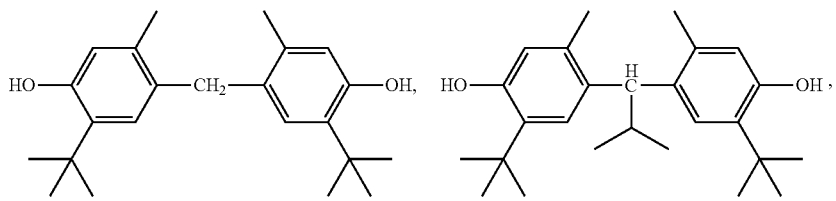

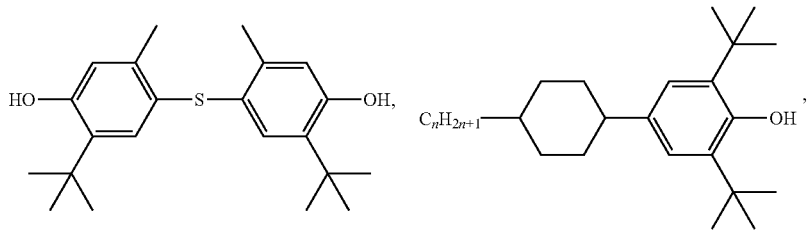

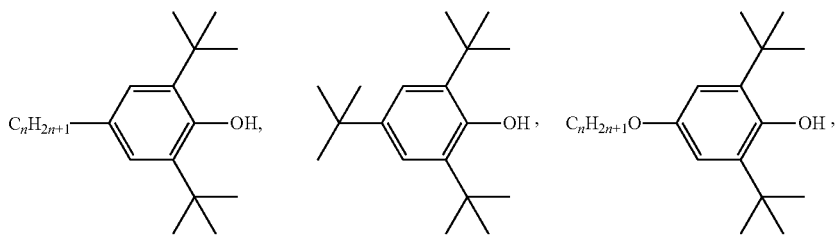

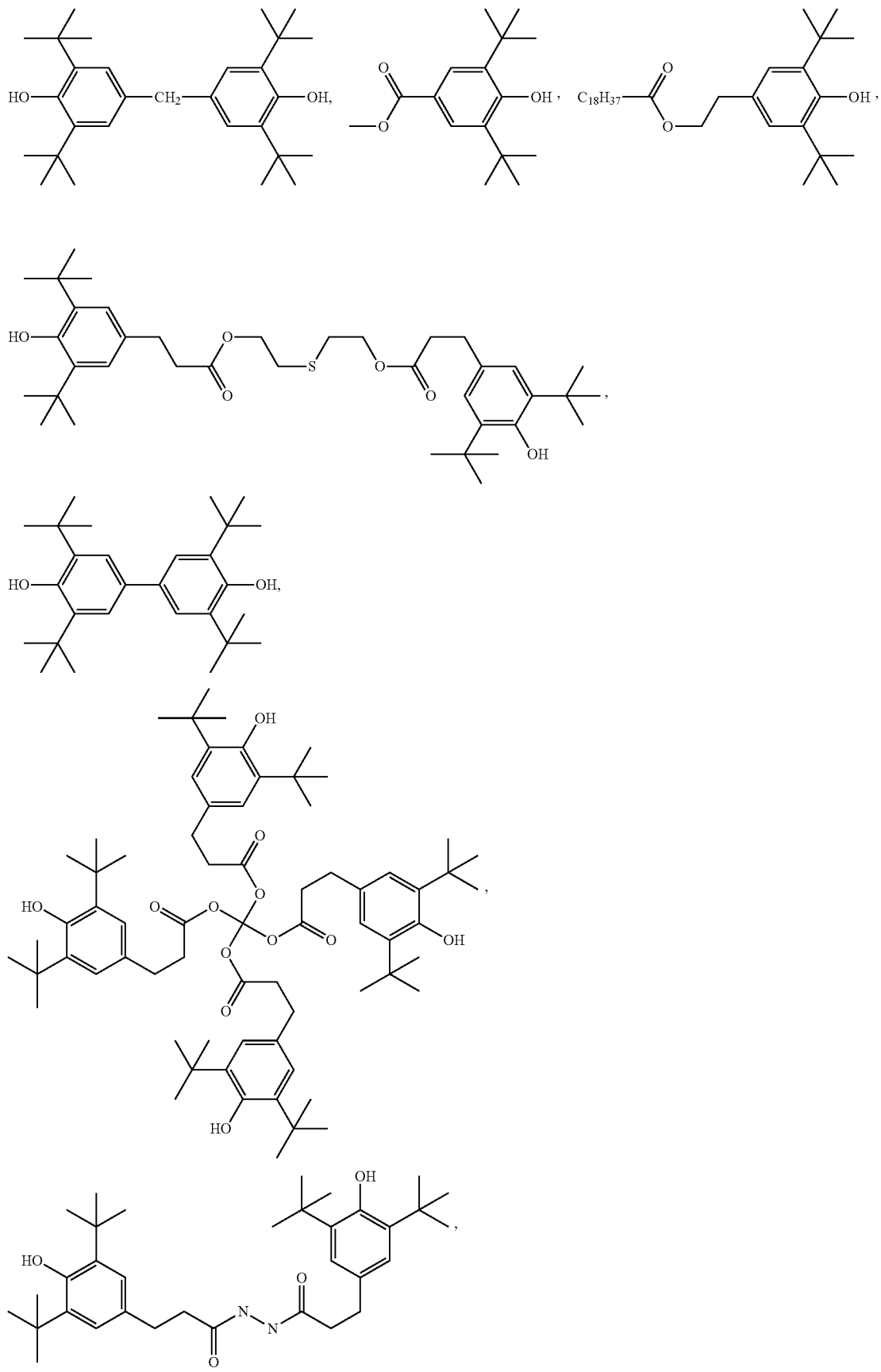

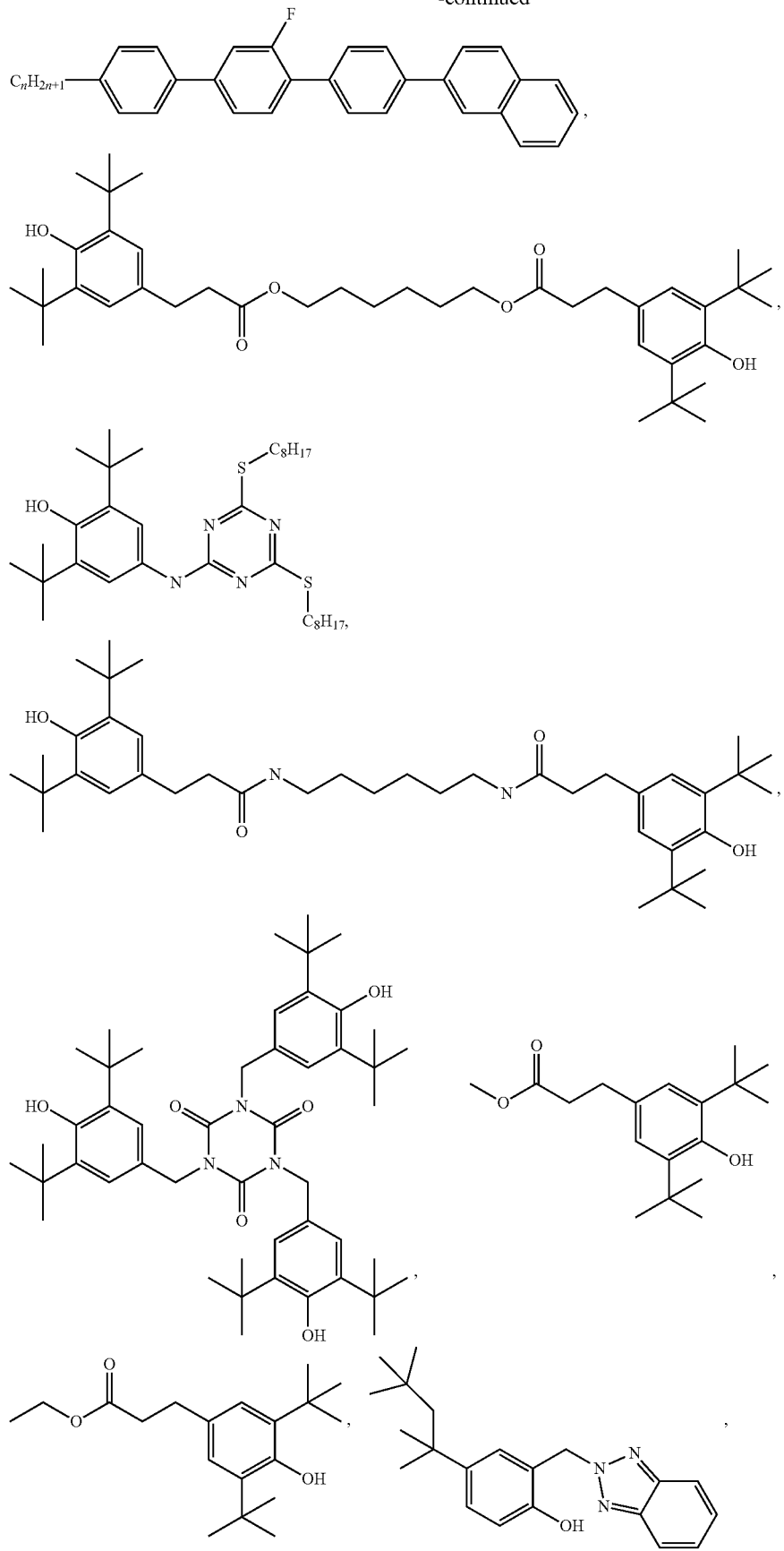

27 28
-continued
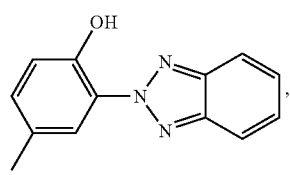 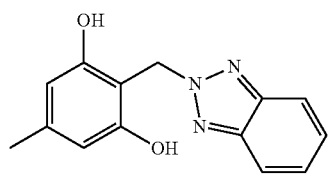 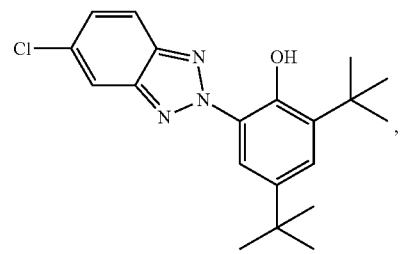
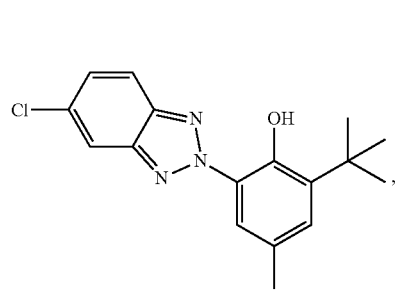 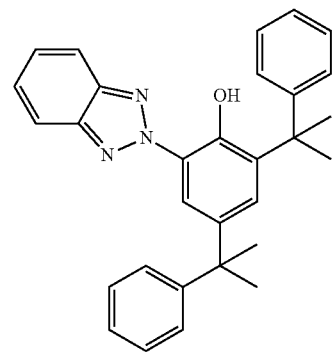 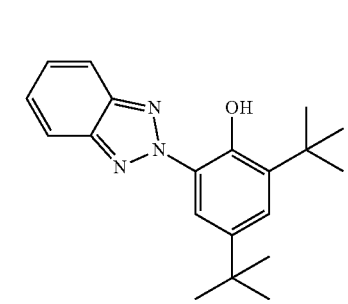
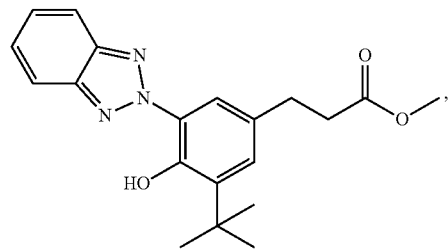 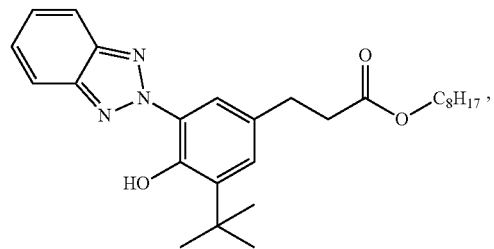
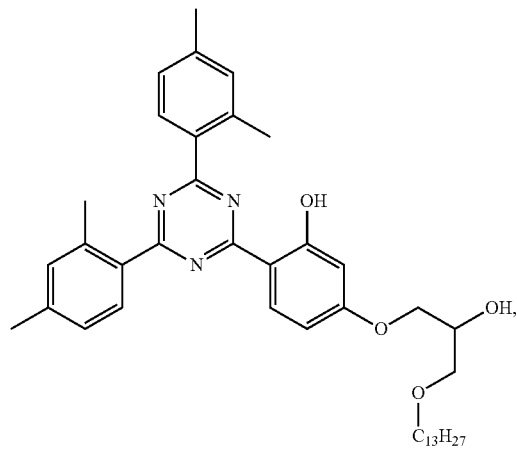 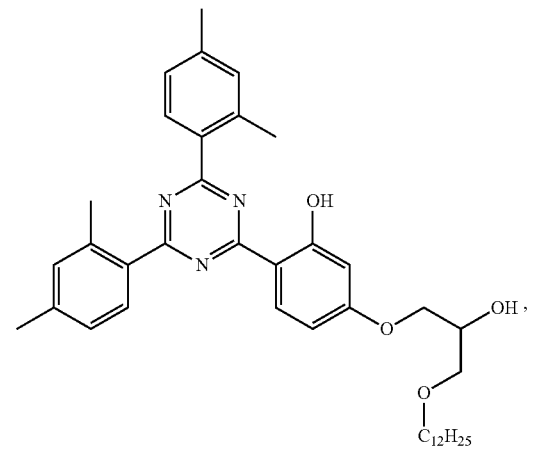

-continued

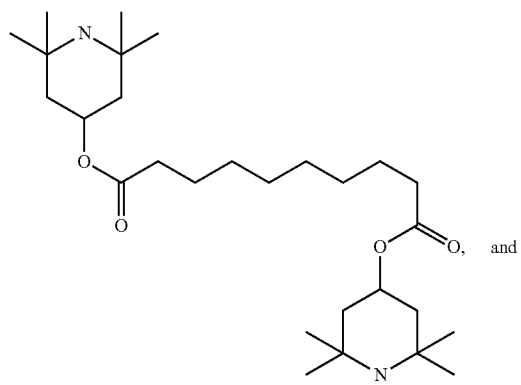 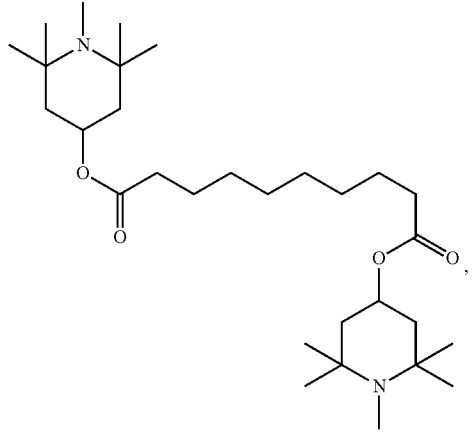

wherein n represents a positive integer from 1 to 12 (for example, 1, 2, 3, 4, 5, 6, 8, 10 or 11).

Preferably, the stabilizer is selected from the following stabilizers:

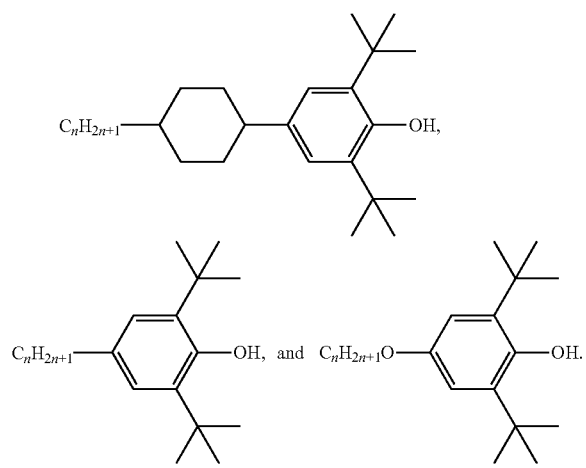

In a preferred embodiment of the present disclosure, the stabilizer accounts for 0 to 5% of the total weight of the liquid crystal composition; preferably, the stabilizer accounts for 0 to 1% of the total weight of the liquid crystal composition; more preferably, the stabilizer accounts for 0.01% to 0.1% of the total weight of the liquid crystal composition.

In another aspect, the present disclosure provides a liquid crystal display device containing the liquid crystal composition described above.

Preferably, the liquid crystal display device is an IPS liquid crystal display device, an FFS liquid crystal display device or a VA liquid crystal display device.

Compared with the related art, the present disclosure has beneficial effects described below.

The liquid crystal compositions provided by the present disclosure have the characteristics of high clearing point, large optical anisotropy, large dielectric anisotropy, large $\varepsilon_\perp$ (i.e., dielectric constant perpendicular to the molecular axis), large $\varepsilon_\perp/|\Delta\varepsilon|$ (i.e., ratio of perpendicular dielectric to a absolute value of dielectric), and large $K_{ave}$ (i.e., average elastic constant), and the liquid crystal display devices containing these liquid crystal compositions have the effects of good transmittance and high contrast. The liquid crystal compositions of the present disclosure can meet the requirements of the liquid crystal display device on low power consumption and good display effect and has high application value in liquid crystal displays of IPS mode, FFS mode, and VA mode.

DETAILED DESCRIPTION

The technical solutions of the present disclosure are described below in conjunction with specific embodiments. Those skilled in the art should understand that the following embodiments are examples of the present disclosure, are used for a better understanding of the present disclosure and should not be construed as limitations to the present disclosure. Various combinations and improvements may be made within the concept of the present disclosure without departing from the spirit and scope of the present disclosure.

In the present disclosure, unless otherwise specified, the proportions mentioned in the present disclosure are weight ratios, and temperatures are Celsius temperatures.

For ease of expression, in the following examples, the group structures of the liquid crystal composition are represented by the codes listed in Table 1.

TABLE 1

Codes of group structures in the liquid crystal composition

| Group unit structure | Code | Group name |
|---|---|---|
| ⌬ | C | 1,4-cyclohexylene |

TABLE 1-continued

Codes of group structures in the liquid crystal composition

| Group unit structure | Code | Group name |
|---|---|---|
| (1,4-phenylene ring) | P | 1,4-phenylene |
| (2-fluoro-1,4-phenylene ring) | G | 2-fluoro-1,4-phenylene |
| (2,3-difluoro-1,4-phenylene ring) | W | 2,3-difluoro-1,4-phenylene |
| (4,6-difluoro-dibenzo[b,d]furan-3,7-diyl) | B(O) | 4,6-difluoro-dibenzo[b,d]furan-3,7-diyl |
| (4,6-difluoro-dibenzo[b,d]thiophene-3,7-diyl) | B(S) | 4,6-difluoro-dibenzo[b,d]thiophene-3,7-diyl |
| (tetrahydrofuran-2,5-diyl) | THF(2,5) | tetrahydrofuran-2,5-diyl |
| (tetrahydrothiophene-2,5-diyl) | THT(2,5) | tetrahydrothiophene-2,5-diyl |
| (cyclopentyl) | C(5) | cyclopentyl |
| (tetrahydrofuran-2-yl) | THF | tetrahydrofuran-2-yl |
| (tetrahydrofuran-3-yl) | THF(3) | tetrahydrofuran-3-yl |
| (4,5-dihydrofuran-2-yl) | DHF(1) | 4,5-dihydrofuran-2-yl |
| (tetrahydrothiophene-2-yl) | THT | tetrahydrothiophene-2-yl |
| (tetrahydrothiophene-3-yl) | THT(3) | tetrahydrothiophene-3-yl |
| —CH$_2$CH$_2$— | 2 | ethyl bridging group |
| —CH$_2$CH$_2$CH$_2$— | 3 | propyl bridging group |
| —CH$_2$O— | 1O | methyleneoxy |
| —F | F | fluorine substituent |
| —O— | O | oxygen bridging group |

TABLE 1-continued

Codes of group structures in the liquid crystal composition

| Group unit structure | Code | Group name |
|---|---|---|
| —S— | S | sulphur bridging group |
| —$C_nH_{2n+1}$ | n (n represents a positive integer from 1 to 12) | alkyl |
| —CH═CH— or —CH═$CH_2$ | V | vinyl |

The following will be described with a compound of the following structure formula as an example:

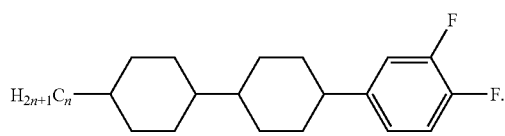

If represented by codes listed in Table 1, the structure formula may be expressed as: nCCGF, wherein n represents the number of C atoms of alkyl on the left terminal, for example, n is 3, which means that the alkyl is —$C_3H_7$; and, C represents 1,4-cyclohexylene, G represents 2-fluoro-1,4-phenylene, and F represents a fluorine substituent.

The abbreviated code names of the test items in the following embodiments are as follows:

Cp clearing point (nematic-isotropic phase transition temperature, ° C.)

Δε dielectric anisotropy (1 KHz, 25° C.)

$ε_⊥$ dielectric constant perpendicular to the molecular axis (1 KHz, 25° C.)

$ε_⊥/|Δε|$ ratio of perpendicular dielectric constant to the absolute value of dielectric constant Δn optical anisotropy (light wavelength 589 nm, 25° C.)

γ1 rotary viscosity (mPa·s, 25° C.)

$K_{ave}$ average elastic constant

T (%) transmittance (DMS-505, cell gap 3.5 μm)

Cp: measured by using a melting point apparatus.

Δε: $Δε=ε_∥-ε_⊥$, wherein $ε_∥$ is a dielectric constant parallel to the molecular axis, $ε_⊥$ is a dielectric constant perpendicular to the molecular axis, and the test conditions are: 25° C., 1 KHz, and a TN90 test cell with a cell gap of 7 μm.

Δn: measured by using Abbe refractometer under the light source of sodium lamp (589 nm) and at 25° C.

$γ_1$: measured by using LCM-2 liquid crystal physical property evaluation system with the test conditions: 25° C., 240 V, and test cell gap of 20 μm.

$K_{ave}=⅓(K_{11}+K_{22}+K_{33})$, and $K_{11}$, $K_{22}$, and $K_{33}$ were calculated by testing the C-V curve of liquid crystal using the LCR instrument and anti-parallel friction cells with the test conditions: a 7 μm anti-parallel friction cell and V=0.1 V to 20 V.

Test conditions of transmittance: the V-T curve of a dimming device, whish was a negative IPS test cell with a cell gap of 3.5 μm, was tested by using DMS 505 photoelectric comprehensive tester, and the $T_{max}$ value in the V-T curve was the transmittance of the liquid crystal material.

Each component adopted in the following embodiments can be synthesized by using well-known methods or can be obtained commercially. These synthesis techniques are conventional, and the obtained liquid crystal compositions have been tested and proved to meet the standards of electronic compounds.

Liquid crystal compositions were prepared according to the proportions of liquid crystal compositions specified in the following examples. The preparation of the liquid crystal compositions was carried out according to the conventional methods in the art, such as heating, ultrasonic wave, suspension, and the like, and by mixing components according to specified proportions.

Comparative Example 1

A liquid crystal composition, whose components and performance parameters are shown in Table 2.

TABLE 2

Components and performance parameters of the liquid crystal composition

| Component code | Weight percent | General formula code | Performance parameter | |
|---|---|---|---|---|
| 3CCWO2 | 8 | N5 | Cp | 77 |
| 2CCWO2 | 8 | N5 | Δn | 0.096 |
| 3CPWO2 | 8 | N11 | Δε | −3.6 |
| 4CPWO2 | 6 | N11 | $ε_⊥$ | 6.4 |
| 5OPWO2 | 3 | II | $ε_⊥/|Δε|$ | 1.78 |
| 3OPWO2 | 6 | II | γ1 | 95 |
| 3CWO2 | 6 | N2 | $K_{ave}$ | 12.6 |
| 1PP2V | 2 | M6 | T | 13.1% |
| 3CPP2 | 1.5 | M16 | | |
| 3CCV | 33.5 | M1 | | |
| 3CCV1 | 10 | M1 | | |
| 2OB(O)O3 | 2 | | | |
| 3OB(O)O4 | 3 | | | |
| 3OB(S)O5 | 3 | | | |
| Total | 100 | | | |

Example 1

A liquid crystal composition, whose components and performance parameters are shown in Table 3.

TABLE 3

Components and performance parameters of the liquid crystal composition

| Component code | Weight percent | General formula code | Performance parameter | |
|---|---|---|---|---|
| 3CCWO2 | 8 | N5 | Cp | 81 |
| 2CCWO2 | 8 | N5 | Δn | 0.099 |
| 3CPWO2 | 8 | N11 | Δε | −3.8 |
| 4CPWO2 | 6 | N11 | $ε_⊥$ | 6.9 |
| 5OPWO2 | 3 | II | $ε_⊥/|Δε|$ | 1.82 |
| 3OPWO2 | 6 | II | γ1 | 94 |
| 3CWO2 | 6 | N2 | $K_{ave}$ | 13.5 |
| 1PP2V | 2 | M6 | T | 14.0% |
| 3CPP2 | 1.5 | M16 | | |
| 3CCV | 33.5 | M1 | | |

TABLE 3-continued

Components and performance parameters of the liquid crystal composition

| Component code | Weight percent | General formula code | Performance parameter | |
|---|---|---|---|---|
| 3CCV1 | 10 | M1 | | |
| THF1OB(O)O4 | 2 | I | | |
| THF1OB(O)O5 | 3 | I | | |
| THF1OB(O)O3 | 3 | I | | |
| Total | 100 | | | |

Comparative Example 2

A liquid crystal composition, whose components and performance parameters are shown in Table 4.

TABLE 4

Components and performance parameters of the liquid crystal composition

| Component code | Weight percent | General formula code | Performance parameter | |
|---|---|---|---|---|
| 3C1OWO2 | 6 | N3 | Cp | 76 |
| 2CC1OWO2 | 10.5 | N6 | $\Delta n$ | 0.101 |
| 3CC1OWO2 | 10 | N6 | $\Delta \varepsilon$ | −3.6 |
| 4CC1OWO2 | 6 | N6 | $\varepsilon \perp$ | 6.1 |
| 5PWO2 | 7 | N10 | $\varepsilon \perp / |\Delta \varepsilon|$ | 1.69 |
| 3PWO2 | 3 | N10 | $\gamma 1$ | 103 |
| 3CPWO2 | 6 | N11 | $K_{ave}$ | 13.5 |
| 4CPWO2 | 1.5 | N11 | T | 13.5% |
| 3CPP2 | 1.5 | M16 | | |
| 3CCV | 38.5 | M1 | | |
| 3CCV1 | 5 | M1 | | |
| C(5)OB(O)O5 | 2 | | | |
| C(5)OB(S)O3 | 3 | | | |
| Total | 100 | | | |

Example 2

A liquid crystal composition, whose components and performance parameters are shown in Table 5.

TABLE 5

Components and performance parameters of the liquid crystal composition

| Component code | Weight percent | General formula code | Performance parameter | |
|---|---|---|---|---|
| 3C1OWO2 | 6 | N3 | Cp | 78 |
| 2CC1OWO2 | 10.5 | N6 | $\Delta n$ | 0.104 |
| 3CC1OWO2 | 10 | N6 | $\Delta \varepsilon$ | −3.7 |
| 4CC1OWO2 | 6 | N6 | $\varepsilon \perp$ | 6.9 |
| 5OPWO2 | 7 | II | $\varepsilon \perp / |\Delta \varepsilon|$ | 1.86 |
| 3OPWO2 | 3 | II | $\gamma 1$ | 100 |
| 3CPWO2 | 6 | N11 | $K_{ave}$ | 13.9 |
| 4CPWO2 | 1.5 | N11 | T | 14.2% |
| 3CPP2 | 1.5 | M16 | | |
| 3CCV | 38.5 | M1 | | |
| 3CCV1 | 5 | M1 | | |
| C(5)OB(O)O5 | 2 | I | | |
| C(5)OB(S)O3 | 3 | I | | |
| Total | 100 | | | |

Example 3

A liquid crystal composition, whose components and performance parameters are shown in Table 6.

TABLE 6

Components and performance parameters of the liquid crystal composition

| Component code | Weight percent | General formula code | Performance parameter | |
|---|---|---|---|---|
| 3C1OWO2 | 11.5 | N3 | Cp | 83 |
| 2CC1OWO2 | 2 | N6 | $\Delta n$ | 0.109 |
| 3CC1OWO2 | 12.5 | N6 | $\Delta \varepsilon$ | −3.5 |
| 2OPWO2 | 6.5 | II | $\varepsilon \perp$ | 7.5 |
| 3CCV | 37 | M1 | $\varepsilon \perp / |\Delta \varepsilon|$ | 2.14 |
| 3CCV1 | 3 | M2 | $\gamma 1$ | 89 |
| 3PPWO4 | 2 | N12 | $K_{ave}$ | 14.3 |
| 3PPWO2 | 2 | N12 | T | 14.8% |
| 5PPWO2 | 1 | N12 | | |
| 4PPWO2 | 2 | N12 | | |
| 3CPP2V | 2 | M16 | | |
| 3CPP2V1 | 3 | M16 | | |
| 3CPWO2 | 9 | N11 | | |
| 5OWO3 | 1.5 | II | | |
| THF1OB(O)O4 | 2.5 | I | | |
| THF1OB(O)O5 | 2.5 | I | | |
| Total | 100 | | | |

Example 4

A liquid crystal composition, whose components and performance parameters are shown in Table 7.

TABLE 7

Components and performance parameters of the liquid crystal composition

| Component code | Weight percent | General formula code | Performance parameter | |
|---|---|---|---|---|
| 3PWO2 | 11.5 | N10 | Cp | 78 |
| 2CC1OWO2 | 4.5 | N6 | $\Delta n$ | 0.11 |
| 3CC1OWO2 | 10 | N6 | $\Delta \varepsilon$ | −3.8 |
| 2OPWO2 | 6.5 | II | $\varepsilon \perp$ | 7.8 |
| 3CCV | 38 | M1 | $\varepsilon \perp / |\Delta \varepsilon|$ | 2.05 |
| 3CCWO4 | 3 | N5 | $\gamma 1$ | 87 |
| 3PPWO2 | 2 | N12 | $K_{ave}$ | 14.8 |
| 4PPWO2 | 2 | N12 | T | 14.5% |
| 3CPWO2 | 9 | N11 | | |
| 5OWO3O4 | 1.5 | II | | |
| C(5)OB(O)O1THF | 2.5 | I | | |
| C(5)OB(S)O1THF | 2.5 | I | | |
| THF1OB(S)O4 | 2 | I | | |
| THF1OB(S)O3 | 3 | I | | |
| 1PP2V | 2 | M6 | | |
| Total | 100 | | | |

Example 5

A liquid crystal composition, whose components and performance parameters are shown in Table 8.

TABLE 8

Components and performance parameters of the liquid crystal composition

| Component code | Weight percent | General formula code | Performance parameter | |
|---|---|---|---|---|
| 3PWO2 | 10.5 | N10 | Cp | 80 |
| 2CC1OWO2 | 4.5 | N6 | $\Delta n$ | 0.11 |
| 3CC1OWO2 | 4 | N6 | $\Delta \varepsilon$ | −4.2 |

TABLE 8-continued

Components and performance parameters of the liquid crystal composition

| Component code | Weight percent | General formula code | Performance parameter | |
|---|---|---|---|---|
| 2OPWO2 | 10.5 | II | $\varepsilon_\perp$ | 7.9 |
| 3CCV | 35 | M1 | $\varepsilon_\perp/|\Delta\varepsilon|$ | 1.88 |
| 3CCWO4 | 3 | N5 | $\gamma 1$ | 82 |
| 3CPWO2 | 7 | N11 | $K_{ave}$ | 15.1 |
| 3OWO3O4 | 3.5 | II | T | 15.3% |
| THF1OB(O)O4 | 2.5 | I | | |
| THF1OB(O)O5 | 2.5 | I | | |
| 2THF(2,5)1OB(S)O4 | 2 | I | | |
| THF1OB(S)O3 | 3 | I | | |
| C(5)1OB(S)O3 | 3 | I | | |
| C(5)1OB(O)O3 | 3 | I | | |
| C(5)1OB(O)O4 | 3 | I | | |
| C(5)1OB(S)O4 | 3 | I | | |
| Total | 100 | | | |

Example 6

A liquid crystal composition, whose components and performance parameters are shown in Table 9.

TABLE 9

Components and performance parameters of the liquid crystal composition

| Component code | Weight percent | General formula code | Performance parameter | |
|---|---|---|---|---|
| 4CC1OWO2 | 8 | N6 | Cp | 76 |
| 3CC1OWO2 | 12.5 | N6 | $\Delta n$ | 0.11 |
| 2OPWO2 | 7 | II | $\Delta\varepsilon$ | −4.1 |
| 3PWO2 | 5.5 | N10 | $\varepsilon_\perp$ | 7.5 |
| 3PPWO4 | 2 | N12 | $\varepsilon_\perp/|\Delta\varepsilon|$ | 1.83 |
| 3PPWO2 | 2 | N12 | $\gamma 1$ | 90 |
| 3CPWO2 | 5 | N11 | $K_{ave}$ | 14.1 |
| 4OWO3 | 1.5 | II | T | 14.9% |
| 3CCV | 40.5 | M1 | | |
| 3CPP2V | 1.5 | M16 | | |
| 3CPP2V1 | 1.5 | M16 | | |
| THF2OB(O)O4 | 2.5 | I | | |
| THF2OB(O)O5 | 2.5 | I | | |
| THF1OB(S)O4 | 2 | I | | |
| THF1OB(S)O3 | 3 | I | | |
| C(5)1OB(S)O3 | 3 | I | | |
| Total | 100 | | | |

Example 7

A liquid crystal composition, whose components and performance parameters are shown in Table 10.

TABLE 10

Components and performance parameters of the liquid crystal composition

| Component code | Weight percent | General formula code | Performance parameter | |
|---|---|---|---|---|
| 3OPWO3O4 | 3 | II | Cp | 91 |
| 2CC1OWO2 | 2.5 | N6 | $\Delta n$ | 0.107 |
| 3CC1OWO2 | 11 | N6 | $\Delta\varepsilon$ | −4.1 |
| 2OPWO2 | 6 | II | $\varepsilon_\perp$ | 7.4 |
| 3CCV | 39 | M1 | $\varepsilon_\perp/|\Delta\varepsilon|$ | 1.80 |
| 3CCWO4 | 2 | N5 | $\gamma 1$ | 89 |
| 3CCWO2 | 2 | N5 | $K_{ave}$ | 15 |
| 3CPWO2 | 4 | N11 | T | 15.1% |
| 3CPP2V | 2 | M16 | | |

TABLE 10-continued

Components and performance parameters of the liquid crystal composition

| Component code | Weight percent | General formula code | Performance parameter | |
|---|---|---|---|---|
| 3CPP2V1 | 3 | M16 | | |
| 3CPWO2 | 8 | N11 | | |
| 3OWO2 | 4.5 | II | | |
| THF1OB(O)O4 | 2.5 | I | | |
| THF1OB(O)O5 | 2.5 | I | | |
| 2THF(2,5)1OB(S)O4 | 4 | I | | |
| THF1OB(S)O4 | 4 | I | | |
| Total | 100 | | | |

Example 8

A liquid crystal composition, whose components and performance parameters are shown in Table 11.

TABLE 11

Components and performance parameters of the liquid crystal composition

| Component code | Weight percent | General formula code | Performance parameter | |
|---|---|---|---|---|
| 3OPWO3O4 | 3 | II | Cp | 90 |
| 2CC1OWO2 | 2.5 | N6 | $\Delta n$ | 0.106 |
| 3CC1OWO2 | 12 | N6 | $\Delta\varepsilon$ | −4 |
| 2OPWO2 | 6 | II | $\varepsilon_\perp$ | 7.3 |
| 3CCV | 36 | M1 | $\varepsilon_\perp/|\Delta\varepsilon|$ | 1.83 |
| 3CCV1 | 4 | M1 | $\gamma 1$ | 87 |
| 3CCWO4 | 2 | N5 | $K_{ave}$ | 15.1 |
| 3CCWO2 | 2 | N5 | T | 15.3% |
| 3CPWO2 | 4 | N11 | | |
| 3CPP2V | 2 | M16 | | |
| 3CPP2V1 | 3 | M16 | | |
| 3CPWO2 | 9 | N11 | | |
| 2OWO3 | 1.5 | II | | |
| THF(3)1OB(O)O4 | 2.5 | I | | |
| THF(3)1OB(O)O5 | 2.5 | I | | |
| DHF(1)1OB(O)O4 | 4 | I | | |
| DHF(1)1OB(O)O5 | 4 | I | | |
| Total | 100 | | | |

As can be seen from the comparison between Comparative Example 1 and Example 1, the compound of general formula I of the present disclosure is more advantageous to increase $\varepsilon_\perp$ which is the dielectric constant perpendicular to the molecular axis, $\varepsilon_\perp/|\Delta\varepsilon|$ which is the ratio of the perpendicular dielectric to the absolute value of the dielectric, and $K_{ave}$ which is the average elastic constant of the liquid crystal composition, and enables the liquid crystal composition to have larger $\varepsilon_\perp$ i.e. dielectric constant perpendicular to the molecular axis, larger $\varepsilon_\perp/|\Delta\varepsilon|$ i.e. the ratio of perpendicular dielectric to the absolute value of the dielectric, and larger $K_{ave}$ i.e. average elastic constant under the premise of substantially equivalent clearing point, optical anisotropy, and dielectric anisotropy, thereby enabling the liquid crystal display device containing the liquid crystal composition to have higher transmittance and higher contrast.

As can be seen from the comparison between Comparative Example 2 and Example 2, the compound of general formula II of the present disclosure is also advantageous to increase $\varepsilon_\perp$ which is the dielectric constant perpendicular to the molecular axis, $\varepsilon_\perp/|\Delta\varepsilon|$ which is the ratio of the perpendicular dielectric to the absolute value of the dielectric, and $K_{ave}$ which is the average elastic constant of the liquid crystal composition, and can produce a more significant improvement on the transmittance and contrast of the liquid crystal composition through the synergistic effect with the compound of general formula I.

As known from Examples 1 to 8 described above, the liquid crystal compositions of the present disclosure have the characteristics of high clearing point, large optical anisotropy, large dielectric anisotropy, large $\varepsilon_\perp$ (i.e., dielectric constant perpendicular to the molecular axis), large $\varepsilon_\perp/|\Delta\varepsilon|$ (i.e., ratio of perpendicular dielectric to the absolute value of dielectric), and large $K_{ave}$ (i.e., average elastic constant); and the liquid crystal display devices containing these liquid crystal compositions have the effects of good transmittance and high contrast. The liquid crystal compositions of the present disclosure can meet the requirements of the liquid crystal display device on low power consumption and good display effect and has high application value in liquid crystal displays of IPS mode, FFS mode, and VA mode.

The applicant has stated that although the liquid crystal composition containing a dibenzo derivative and the liquid crystal display device of the present disclosure are described through the embodiments described above, the present disclosure is not limited to the processes and steps described above, which means that the implementation of the present disclosure does not necessarily depend on the processes and steps described above. It should be apparent to those skilled in the art that any improvements made to the present disclosure, equivalent replacements of raw materials selected in the present disclosure and addition of adjuvant ingredients thereof, selections of specific methods, etc., all fall within the protection scope and the disclosed scope of the present disclosure.

The above embodiments are only intended to illustrate the technical concepts and features of the present disclosure, aim to enable those familiar with the art to understand the content of the present disclosure and implement the present disclosure, and are not intended to limit the scope of the present disclosure. Equivalent changes or modifications made in accordance with the spirit of the present disclosure should be included in the scope of the present disclosure.

What is claimed is:

1. A liquid crystal composition containing a dibenzo derivative, comprising at least one compound of general formula I and at least one compound of general formula II:

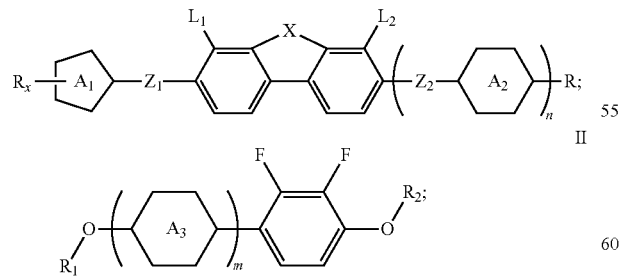

wherein

R represents —H, halogen, —CN, straight alkyl containing 1 to 12 carbon atoms, branched alkyl containing 3 to 12 carbon atoms,

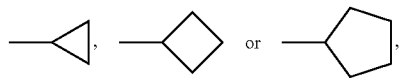

wherein one or at least two non-adjacent —CH$_2$— in the straight alkyl containing 1 to 12 carbon atoms, the branched alkyl containing 3 to 12 carbon atoms,

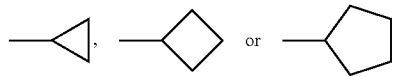

may be respectively and independently substituted by —CH=CH—, —C≡C—, —O—, —S—, —CO—, —CO—O— or —O—CO—, and one or at least two —H in the straight alkyl containing 1 to 12 carbon atoms, the branched alkyl containing 3 to 12 carbon atoms,

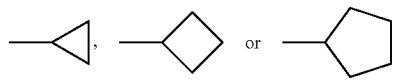

may be respectively and independently substituted by —F or —Cl;

R$_x$ represents -H, straight alkyl containing 1 to 12 carbon atoms, or branched alkyl containing 3 to 12 carbon atoms, wherein one or at least two non-adjacent —CH$_2$— in the straight alkyl containing 1 to 12 carbon atoms or the branched alkyl containing 3 to 12 carbon atoms may be respectively and independently substituted by —CH=CH—, —C≡C—, —O—, —S—, —CO—, —CO—O— or —O—CO—, one or at least two —H in the straight alkyl containing 1 to 12 carbon atoms or the branched alkyl containing 3 to 12 carbon atoms may be respectively and independently substituted by —F or —Cl, and R$_x$ is attached to an arbitrary carbon atom in the ring

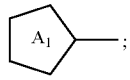

R$_1$ and R$_2$ each independently represents straight alkyl containing 1 to 12 carbon atoms, branched alkyl containing 3 to 12 carbon atoms,

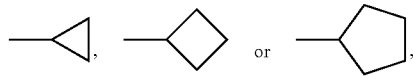

wherein one or at least two non-adjacent —CH$_2$— in the straight alkyl containing 1 to 12 carbon atoms or the branched alkyl containing 3 to 12 carbon atoms may be respectively and independently substituted by —CH=CH—, —C≡C—, —O—, —S—, —CO—, —CO—O— or —O—CO—, one or at least two —H in the straight alkyl containing 1 to 12 carbon atoms or the branched alkyl containing 3 to 12 carbon atoms may be respectively and independently substituted by —F or —Cl, and R$_1$ and R$_2$ are each attached to an oxygen atom in general formula II via a carbon atom;

the ring

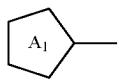

represents

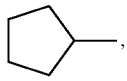

wherein one or at least two intra-ring single bonds in the ring

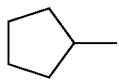

is substituted by a double bond(s); or
the ring

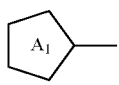

represents

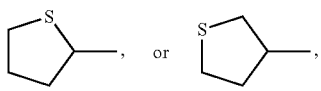

wherein one or at least two intra-ring single bonds in the ring

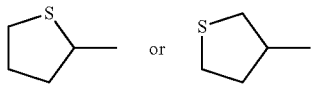

is optionally substituted by a double bond(s)
the ring

represents

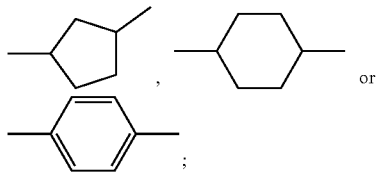

wherein in

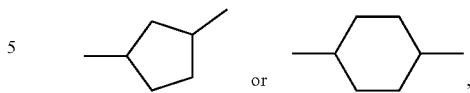

one or at least two —CH$_2$— may be substituted by —O—, and one or at most two intra-ring single bonds may be substituted by a double bond(s); and in

one or at least two —H may be substituted by —F or —Cl, and one or at least two intra-ring —CH= may be substituted by —N=;
the ring

represents

wherein in

one or at least two —H may be substituted by a —F or —Cl, and one or at least two intra-ring —CH= may be substituted by —N=;

$Z_1$ represents —(CH$_2$)$_a$O— or —(CH$_2$)$_a$S—, wherein a represents an integer from 0 to 7;

$Z_2$ represents —O—, —S—, —CO—O—, —O—CO—, —CF$_2$O—, —OCF$_2$—, —CH$_2$S—, —OCH$_2$—, —SCH$_2$—, —CH$_2$—, —CH$_2$CH$_2$—, —(CH$_2$)$_4$—, —CH=CH—CH$_2$O—, —C$_2$F$_4$—, —CH$_2$CF$_2$—, —CF$_2$CH$_2$—, —CF=CF—, —CH=CF—, —CF=CH—, —CH=CH—, —C≡C— or a single bond;

$L_1$ and $L_2$ each independently represents —F, —Cl, —CF$_3$ or —CHF$_2$;

X represents —CO—, —S— or —O— n represents 0, 1 or 2, wherein when n represents 2, the ring

is the same or different, and $Z_2$ is the same or different;

m represents 0, 1 or 2, wherein when m represents 2, the ring

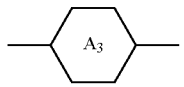

is the same or different; and wherein the compound of general formula I accounts for 3% to 20% of the total weight of the liquid crystal composition.

2. The liquid crystal composition according to claim 1, wherein n represents 0 or 1.

3. The liquid crystal composition according to claim 1, wherein $L_1$ and $L_2$ each represents —F.

4. The liquid crystal composition according to claim 1, wherein the liquid crystal composition comprises at least one compound of general formula I in which X represents —O—.

5. The liquid crystal composition according to claim 1, wherein the ring

represents

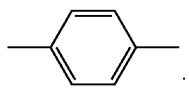

.

6. The liquid crystal composition according to claim 1, wherein the compound of general formula II accounts for 0.1% to 30% of the total weight of the liquid crystal composition.

7. The liquid crystal composition according to claim 1, wherein the liquid crystal composition further comprises one or at least two compounds of general formula M:

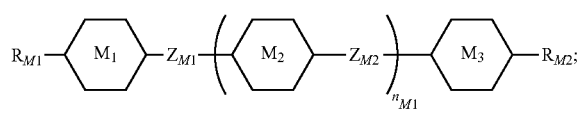   M wherein $R_{M1}$ and $R_{M2}$ each independently represents straight alkyl containing 1 to 12 carbon atoms, branched alkyl containing 3 to 12 carbon atoms,

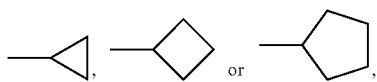

wherein one or at least two non-adjacent —CH$_2$— in the straight alkyl containing 1 to 12 carbon atoms or the branched alkyl containing 3 to 12 carbon atoms may be respectively and independently substituted by —CH=CH—, —C≡C—, —O—, —CO—, —CO—O— or —O—CO—;

the ring

, the ring

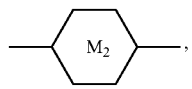

, and the ring each

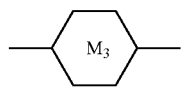

each independently represents

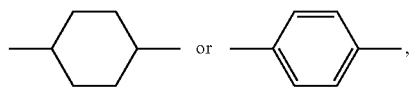

, wherein one or at least two —CH$_2$— in

may be substituted by —O—, and at most one —H in

may be substituted by halogen;

$Z_{M1}$ and $Z_{M2}$ each independently represents a single bond, —CO—O—, —O—CO—, —CH$_2$—, —OCH$_2$—, —CH=CH—, —C≡C—, —CH$_2$CH$_2$—, —(CH$_2$)$_4$—, —CF$_2$O—, —OCF$_2$— or —CF$_2$CF$_2$—;

$n_{M1}$ represents 0, 1, 2 or 3, wherein when $n_{M1}$=2 or 3, the ring

is the same or different, and $Z_{M2}$ is the same or different.

8. The liquid crystal composition according to claim 1, wherein the liquid crystal composition further comprises one or at least two compounds of general formula N:

N

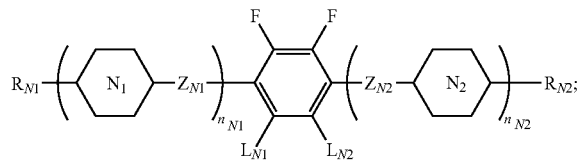

wherein
$R_{N1}$ and $R_{N2}$ each independently represent straight alkyl containing 1 to 12 carbon atoms, branched alkyl containing 3 to 12 carbon atoms,

wherein one or at least two non-adjacent —CH$_2$— in the straight alkyl containing 1 to 12 carbon atoms or the branched alkyl containing 3 to 12 carbon atoms may be respectively and independently substituted by —O—, —CO—, —CO—O— or —O—CO—; one or at least two —H in the straight alkyl containing 1 to 12 carbon atoms, the branched alkyl containing 3 to 12 carbon atoms,

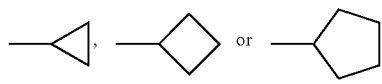

may be respectively and independently substituted by —F or —Cl; and at least one of $R_{N1}$ and $R_{N2}$ is attached to the ring structure in general formula N via a carbon atom;
the ring

and the ring

each independently represents

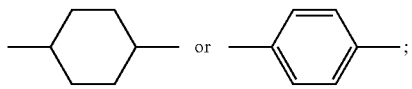

wherein in

one or at least two —CH$_2$— may be substituted by —O—; and in

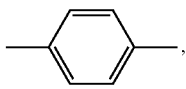

one or at least two —H may be substituted by —F or —Cl, and one or at least two intra-ring —CH= may be substituted by —N=;
$Z_{N1}$ and $Z_{N2}$ each independently represents a single bond, —CO—O—, —O—CO—, —CH$_2$O—, —OCH$_2$—, —CH$_2$CH$_2$—, —(CH$_2$)$_4$—, —CF$_2$—, —OCF$_2$— or —CF$_2$CF$_2$—;
$L_{N1}$ and $L_{N2}$ each independently represents —H or methyl;
$n_{N1}$ represents 0, 1, 2 or 3, $n_{N2}$ represents 0 or 1, and $0 \leq n_{N1}+n_{N2} \leq 3$, wherein when $n_{N1}=2$ or 3, the ring

is the same or different, and $Z_{N1}$ is the same or different.

9. The liquid crystal composition according to claim 4, wherein the liquid crystal composition comprises at least one compound of general formula I in which X represents —O— and at least one compound of general formula I in which X represents —S—.

10. The liquid crystal composition according to claim 1, wherein m represents 0 or 1.

11. The liquid crystal composition according to claim 10, wherein the liquid crystal composition comprises at least one compound of general formula II in which m=0.

12. The liquid crystal composition according to claim 10, wherein the liquid crystal composition comprises at least one compound of general formula II in which m=1.

13. The liquid crystal composition according to claim 10, wherein the liquid crystal composition comprises at least one compound of general formula II in which m=0 and at least one compound of general formula II in which m=1.

14. The liquid crystal composition according to claim 7, wherein the compound of general formula M is selected from the group consisting of the following compounds:

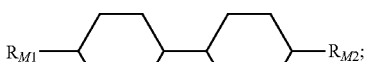

M1

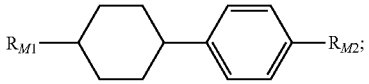

M2

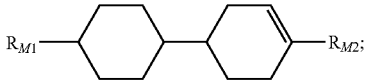

M3

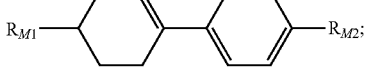

M4

47

-continued

M5: R_{M1}-cyclohexyl-C(=O)O-phenyl-R_{M2}

M6: R_{M1}-phenyl-phenyl-R_{M2}

M7: R_{M1}-(2-fluorophenyl)-phenyl-R_{M2}

M8: R_{M1}-cyclohexyl-CH_2CH_2-cyclohexyl-R_{M2}

M9: R_{M1}-cyclohexyl-CH=CH-cyclohexyl-R_{M2}

M10: R_{M1}-phenyl-C≡C-phenyl-R_{M2}

M11: R_{M1}-phenyl-C(=O)O-phenyl-R_{M2}

M12: R_{M1}-cyclohexyl-cyclohexyl-phenyl-R_{M2}

M13: R_{M1}-cyclohexyl-cyclohexenyl-phenyl-R_{M2}

M14: R_{M1}-cyclohexenyl-cyclohexyl-phenyl-R_{M2}

M15: R_{M1}-cyclohexyl-CH=CH-cyclohexyl-phenyl-R_{M2}

M16: R_{M1}-cyclohexyl-phenyl-phenyl-R_{M2}

M17: R_{M1}-cyclohexenyl-phenyl-phenyl-R_{M2}

48

-continued

M18: R_{M1}-phenyl-phenyl-phenyl-R_{M2}

M19: R_{M1}-phenyl-(2-fluorophenyl)-phenyl-R_{M2}

M20: R_{M1}-(2-fluorophenyl)-phenyl-phenyl-R_{M2}

M21: R_{M1}-cyclohexyl-cyclohexyl-CH_2-O-cyclohexyl-R_{M2}

M22: R_{M1}-cyclohexyl-cyclohexyl-C(=O)O-cyclohexyl-R_{M2}

M23: R_{M1}-cyclohexyl-cyclohexyl-C(=O)O-phenyl-R_{M2}

M24: R_{M1}-cyclohexyl-phenyl-C(=O)O-phenyl-R_{M2}

M25: R_{M1}-cyclohexyl-phenyl-C≡C-phenyl-R_{M2}

M26: R_{M1}-cyclohexyl-cyclohexyl-phenyl-cyclohexyl-R_{M2}

M27: R_{M1}-cyclohexyl-phenyl-phenyl-cyclohexyl-R_{M2}

M28: R_{M1}-cyclohexyl-(3-fluorophenyl)-phenyl-cyclohexyl-R_{M2}

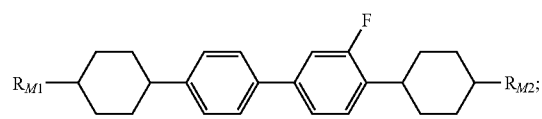

M29

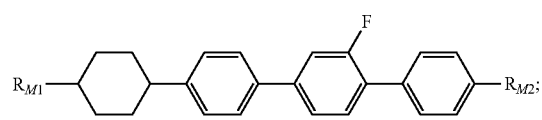

M30

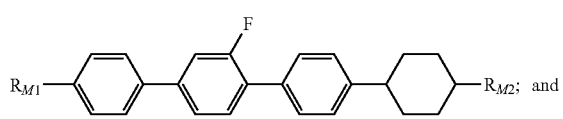

M31

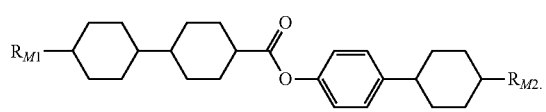

M32

15. The liquid crystal composition according to claim 14, wherein the liquid crystal composition comprises one or at least two compounds of general formula M1 in which $R_{M1}$ and/or $R_{M2}$ are n-propyl.

16. The liquid crystal composition according to claim 14, wherein the compound of general formula M accounts for 10% to 70% of the total weight of the liquid crystal composition.

17. The liquid crystal composition according to claim 8, wherein the compound of general formula N is selected from the group consisting of the following compounds:

N1

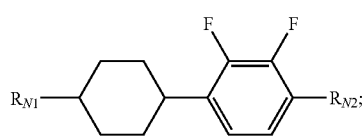

N2

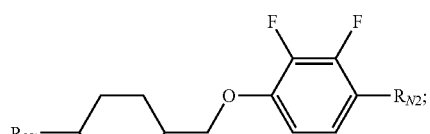

N3

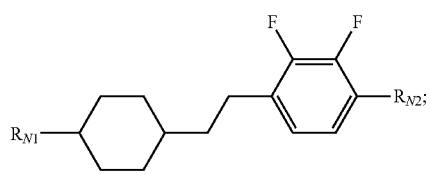

N4

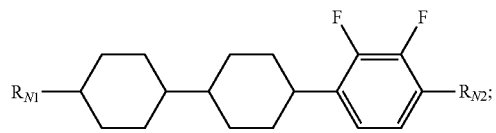

N5

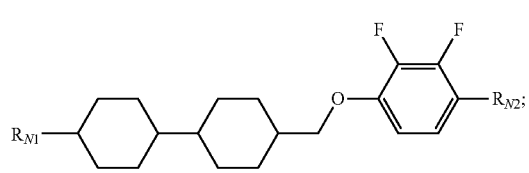

N6

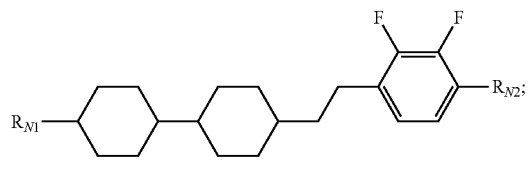

N7

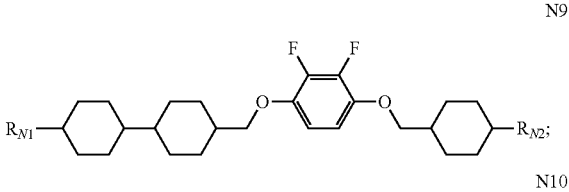

N8

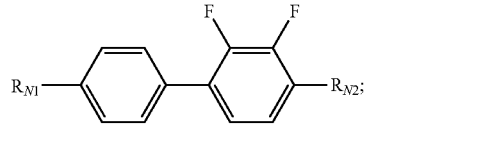

N9

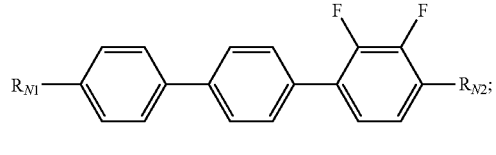

N10

N11

N12

N13

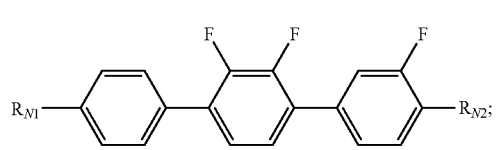

N14

N15
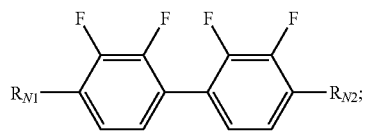

N16
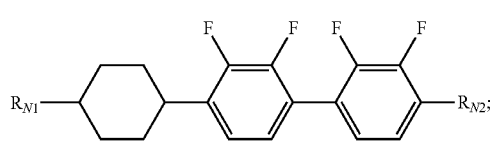

N17
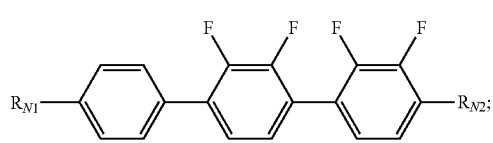

N18
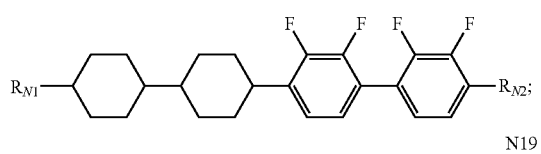

N19
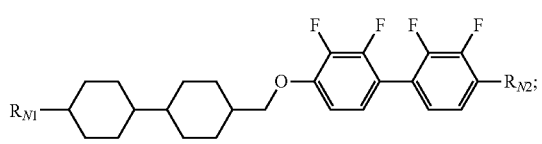

N20
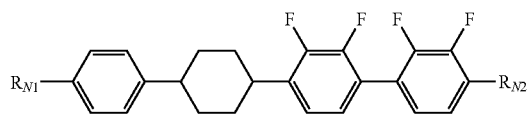

N21
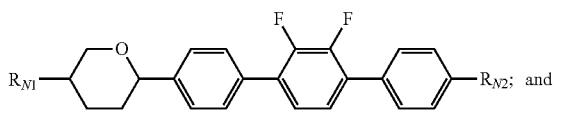

N22
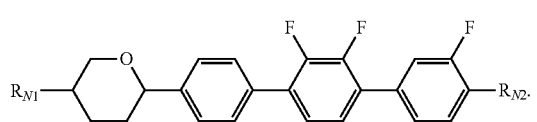

18. The liquid crystal composition according to claim 17, wherein the compound of general formula N accounts for 1% to 75% of the total weight of the liquid crystal composition.

19. A liquid crystal display device containing the liquid crystal composition according to claim 1.

20. A larger elastic constant and/or higher transmittance liquid crystal composition containing a dibenzo derivative, comprising at least one compound of general formula I and at least one compound of general formula II:

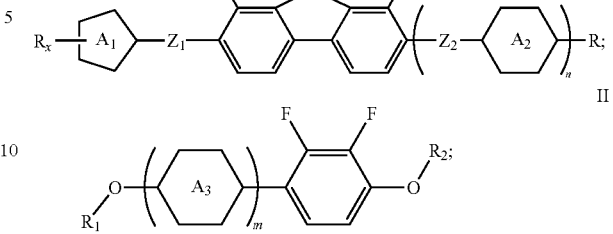

wherein

R represents —H, halogen, —CN, straight alkyl containing 1 to 12 carbon atoms, branched alkyl containing 3 to 12 carbon atoms,

wherein one or at least two non-adjacent —CH$_2$— in the straight alkyl containing 1 to 12 carbon atoms, the branched alkyl containing 3 to 12 carbon atoms,

may be respectively and independently substituted by —CH=CH—, —C≡C—, —O—, —S—, —CO—, —CO—O— or —O—CO—, and one or at least two —H in the straight alkyl containing 1 to 12 carbon atoms, the branched alkyl containing 3 to 12 carbon atoms,

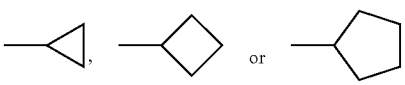

may be respectively and independently substituted by —F or —Cl;

R$_x$ represents —H, straight alkyl containing 1 to 12 carbon atoms, or branched alkyl containing 3 to 12 carbon atoms, wherein one or at least two non-adjacent —CH$_2$— in the straight alkyl containing 1 to 12 carbon atoms or the branched alkyl containing 3 to 12 carbon atoms may be respectively and independently substituted by —CH=CH—, —C≡C—, —O—, —S—, —CO—, —CO—O— or —O—CO—, one or at least two —H in the straight alkyl containing 1 to 12 carbon atoms or the branched alkyl containing 3 to 12 carbon atoms may be respectively and independently substituted by —F or —Cl and R$_x$ is attached to an arbitrary carbon atom in the ring

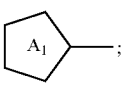

R₁ and R₂ each independently represents straight alkyl containing 1 to 12 carbon atoms, branched alkyl containing 3 to 12 carbon atoms,

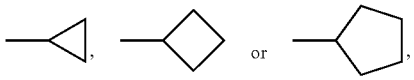

wherein one or at least two non-adjacent —CH₂— in the straight alkyl containing 1 to 12 carbon atoms or the branched alkyl containing 3 to 12 carbon atoms may be respectively and independently substituted by —CH=CH—, —C≡C—, —O—, —S—, —CO—, —CO—O— or —O—CO—, one or at least two —H in the straight alkyl containing 1 to 12 carbon atoms or the branched alkyl containing 3 to 12 carbon atoms may be respectively and independently substituted by —F or —Cl, and R₁ and R₂ are each attached to an oxygen atom in general formula II via a carbon atom;

the ring

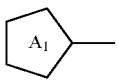

represents

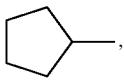

wherein one or at least two intra-ring single bonds in the ring

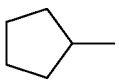

is substituted by a double bond(s):
or the ring

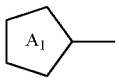

represents

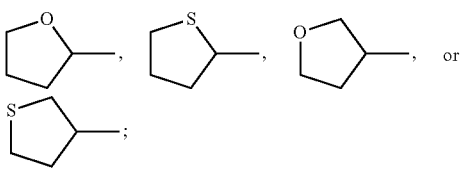

wherein one or at least two intra-ring single bonds in the ring

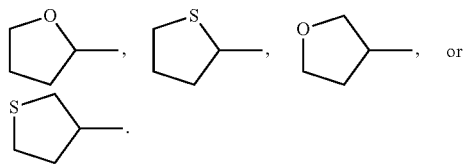

is optionally substituted by a double bond(s);
the ring

represents

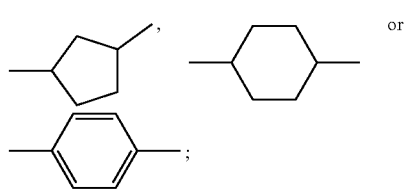

wherein in

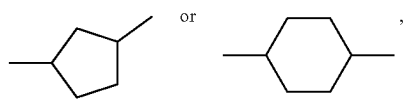

one or at least two —CH₂— may be substituted by —O—, and one or at most two intra-ring single bonds may be substituted by a double bond(s); and in

one or at least two —H may be substituted by a —F or —Cl, and one or at least two intra-ring —CH= may be substituted by a —N=;
the ring

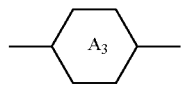

represents

wherein in

one or at least two —H may be substituted be a —F or —Cl, and one or at least two intra-ring —CH═ may be substituted by —N═;

$Z_1$ represents —(CH$_2$)$_a$O— or —(CH$_2$)$_a$S—, wherein a represents an integer from 0 to 7;

$Z_2$ represents —O—, —S—, —CO—O—, —O—CO—, —CF$_2$O—, —OCF$_2$O—, —CH$_2$O—, —CH$_2$S—, —OCH$_2$—, —SCH$_2$—, —CH$_2$—, —CH$_2$CH$_2$—, —(CH$_2$)$_4$—, —CH═CH—CH$_2$O—, —C$_2$F$_4$—CH$_2$CF$_2$—, —CF$_2$CH$_2$—, —CF═CF—, —CH═CF—, —CF═CH—, —CH═CH—, —C≡C— or a single bond;

$L_1$ and $L_2$ each independently represents —F, —Cl, —CF$_3$ or —CHF$_2$;

X represents —CO—, —S— or —O—;

n represents 0, 1 or 2, wherein when n represents 2, the ring

is the same or different, and $Z_2$ is the same or different; and m represents 0, 1 or 2, wherein when m represents 2, the ring

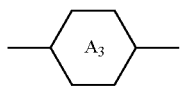

is the same or different;

the liquid crystal composition further comprises one or at least two compounds of general formula M, wherein the compound of general formula M is selected from the group consisting of the following compounds:

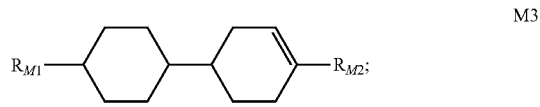

M3

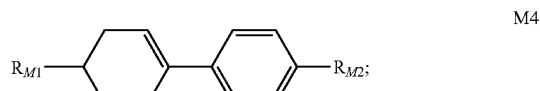

M4

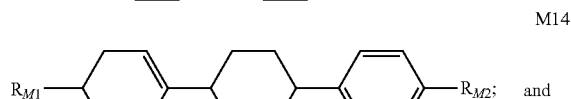

M14 and

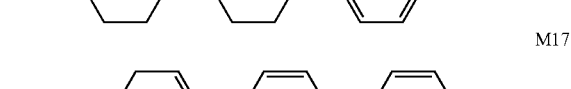

M17 wherein $R_{M1}$ and $R_{M2}$ each independently represents straight alkyl containing 1 to 12 carbon atoms, branched alkyl containing 3 to 12 carbon atoms,

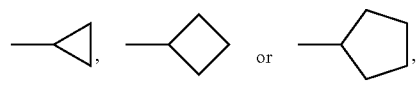

wherein one or at least two non-adjacent —CH$_2$— in the straight alkyl containing 1 to 12 carbon atoms or the branched alkyl containing 3 to 12 carbon atoms may be respectively and independently substituted by —CH═CH—, —C≡C—, —O—, —CO—, —CO—O— or —O—CO—.

* * * * *